(12) United States Patent
Garnier et al.

(10) Patent No.: US 10,954,167 B1
(45) Date of Patent: *Mar. 23, 2021

(54) METHODS FOR PRODUCING METAL CARBIDE MATERIALS

(71) Applicant: Advanced Ceramic Fibers, LLC, Idaho Falls, ID (US)

(72) Inventors: John E. Garnier, Idaho Falls, ID (US); George W. Griffith, Idaho Falls, ID (US)

(73) Assignee: Advanced Ceramic Fibers, LLC, Idaho Falls, ID (US)

(*) Notice: Subject to any disclaimer, the term of this patent is extended or adjusted under 35 U.S.C. 154(b) by 13 days.

This patent is subject to a terminal disclaimer.

(21) Appl. No.: 16/261,246

(22) Filed: Jan. 29, 2019

Related U.S. Application Data

(60) Continuation-in-part of application No. 14/954,518, filed on Nov. 30, 2015, now Pat. No. 10,208,238,
(Continued)

(51) Int. Cl.
*C04B 35/565* (2006.01)
*C04B 35/622* (2006.01)
(Continued)

(52) U.S. Cl.
CPC ........ *C04B 35/62281* (2013.01); *B82Y 30/00* (2013.01); *C01B 32/956* (2017.08);
(Continued)

(58) Field of Classification Search
CPC .......... B01J 27/22; B01J 27/224; B01J 19/00; C04B 35/565; C04B 35/56; C04B 35/58;
(Continued)

(56) References Cited

U.S. PATENT DOCUMENTS

| 2,784,112 A | 3/1957 | Nicholson |
| 3,028,256 A | 4/1962 | Simnad |

(Continued)

FOREIGN PATENT DOCUMENTS

| CA | 2421032 | 4/2002 |
| CN | 2700346 Y | 5/2005 |

(Continued)

OTHER PUBLICATIONS

US 10,822,240 B2, 11/2020, Pegna (withdrawn)*
(Continued)

*Primary Examiner* — Jane L Stanley

(57) ABSTRACT

Methods of producing silicon carbide, and other metal carbide materials. The method comprises reacting a carbon material (e.g., fibers, or nanoparticles, such as powder, platelet, foam, nanofiber, nanorod, nanotube, whisker, graphene (e.g., graphite), fullerene, or hydrocarbon) and a metal or metal oxide source material (e.g., in gaseous form) in a reaction chamber at an elevated temperature ranging up to approximately 2400° C. or more, depending on the particular metal or metal oxide, and the desired metal carbide being produced. A partial pressure of oxygen in the reaction chamber is maintained at less than approximately $1.01 \times 10^2$ Pascal, and overall pressure is maintained at approximately 1 atm.

20 Claims, 2 Drawing Sheets

Related U.S. Application Data which is a continuation-in-part of application No. 13/215,967, filed on Aug. 23, 2011, now Pat. No. 9,199,227, and a continuation-in-part of application No. 12/901,326, filed on Oct. 8, 2010, now Pat. No. 9,275,762, and a continuation-in-part of application No. 14/570,927, filed on Dec. 15, 2014, now Pat. No. 9,272,913, which is a division of application No. 12/901,309, filed on Oct. 8, 2010, now Pat. No. 8,940,391, said application No. 14/954,518 is a continuation-in-part of application No. 14/615,685, filed on Feb. 6, 2015, now Pat. No. 9,803,296.

(60) Provisional application No. 61/941,001, filed on Feb. 18, 2014.

(51) Int. Cl.
| | |
|---|---|
| *B82Y 30/00* | (2011.01) |
| *C04B 35/571* | (2006.01) |
| *C04B 35/573* | (2006.01) |
| *C04B 35/80* | (2006.01) |
| *C01B 32/956* | (2017.01) |

(52) U.S. Cl.
CPC .......... *C04B 35/565* (2013.01); *C04B 35/571* (2013.01); *C04B 35/573* (2013.01); *C04B 35/806* (2013.01); *C04B 2235/428* (2013.01); *C04B 2235/46* (2013.01); *C04B 2235/48* (2013.01); *C04B 2235/526* (2013.01); *C04B 2235/5244* (2013.01); *C04B 2235/5248* (2013.01); *C04B 2235/5264* (2013.01); *C04B 2235/5284* (2013.01); *C04B 2235/5445* (2013.01); *C04B 2235/616* (2013.01); *C04B 2235/72* (2013.01); *C04B 2235/767* (2013.01); *Y10T 428/24993* (2015.04); *Y10T 428/249924* (2015.04); *Y10T 428/249928* (2015.04); *Y10T 428/249974* (2015.04); *Y10T 428/292* (2015.01); *Y10T 428/2918* (2015.01); *Y10T 428/2933* (2015.01); *Y10T 428/2958* (2015.01); *Y10T 428/2964* (2015.01); *Y10T 428/2967* (2015.01); *Y10T 428/2975* (2015.01)

(58) Field of Classification Search
CPC ......... C04B 35/71; C04B 35/76; C04B 35/80; C09K 5/14; C23C 28/34; C23C 28/341; C08K 7/04; C08K 9/04; D01F 9/08; D01F 11/124; D01F 11/126
USPC ...... 501/87, 88, 94, 95.1, 96.1, 99; 427/585, 427/588, 589, 249.1, 249.4, 249.15
See application file for complete search history.

(56) References Cited

U.S. PATENT DOCUMENTS

| | | |
|---|---|---|
| 3,166,614 A | 1/1965 | Taylor |
| 3,175,884 A | 3/1965 | Kuhn |
| 3,246,950 A | 4/1966 | Gruber |
| 3,369,920 A | 2/1968 | Bourdeau et al. |
| 3,386,840 A | 6/1968 | Gruber |
| 3,425,625 A | 2/1969 | Babl et al. |
| 3,427,222 A | 2/1969 | Biancheria et al. |
| 3,447,952 A | 6/1969 | Hertl |
| 3,488,291 A | 1/1970 | Hardy et al. |
| 3,519,472 A | 7/1970 | Dyne et al. |
| 3,535,080 A | 10/1970 | Pyl |
| 3,725,533 A | 4/1973 | Economy et al. |
| 3,764,550 A | 10/1973 | Block et al. |
| 3,808,087 A | 4/1974 | Milewski et al. |
| 3,813,340 A | 5/1974 | Knippenberg et al. |
| 3,825,469 A | 7/1974 | Economy et al. |
| 3,925,151 A | 12/1975 | Klepfer |
| 3,932,594 A | 1/1976 | Gortsema |
| 4,008,090 A | 2/1977 | Miyake et al. |
| 4,013,503 A | 3/1977 | Knippenberg et al. |
| 4,022,662 A | 5/1977 | Gordon et al. |
| 4,107,276 A | 8/1978 | Schwetz et al. |
| 4,141,948 A | 2/1979 | Laskow et al. |
| 4,158,687 A | 6/1979 | Yajima et al. |
| 4,209,334 A | 6/1980 | Panzera |
| 4,225,355 A | 9/1980 | Galasso et al. |
| 4,284,612 A | 8/1981 | Horne, Jr. et al. |
| 4,294,788 A | 10/1981 | Laskow et al. |
| 4,406,012 A | 9/1983 | Gordon et al. |
| 4,445,942 A | 5/1984 | Cheng et al. |
| 4,473,410 A | 9/1984 | Grubb et al. |
| 4,566,700 A | 1/1986 | Shicmbob |
| 4,626,461 A | 12/1986 | Prewo et al. |
| 4,707,330 A | 11/1987 | Ferrari |
| 4,731,298 A | 3/1988 | Shindo |
| 4,749,556 A | 6/1988 | Parrish et al. |
| 4,756,895 A | 7/1988 | Boecker et al. |
| 4,770,935 A | 9/1988 | Yamamura et al. |
| 4,784,839 A | 11/1988 | Bachelard et al. |
| 4,784,978 A | 11/1988 | Ogasawara et al. |
| 4,851,375 A | 7/1989 | Newkirk et al. |
| 4,853,196 A | 8/1989 | Koshida et al. |
| 4,859,503 A | 8/1989 | Bouix et al. |
| 4,864,186 A | 9/1989 | Milewski et al. |
| 4,889,686 A | 12/1989 | Singh et al. |
| 4,894,203 A | 1/1990 | Adamson |
| 4,908,340 A | 3/1990 | Frechette et al. |
| 4,921,725 A | 5/1990 | Bouix et al. |
| 4,948,573 A | 8/1990 | Nadkarni et al. |
| 4,948,763 A | 8/1990 | Hayashida et al. |
| 4,963,286 A | 10/1990 | Coyle et al. |
| 4,971,673 A | 11/1990 | Weisweiler et al. |
| 4,988,564 A | 1/1991 | D'Angelo et al. |
| 5,020,584 A | 6/1991 | Aghajanian et al. |
| 5,026,604 A | 6/1991 | Thebault |
| 5,063,107 A | 11/1991 | Birchall et al. |
| 5,067,999 A | 11/1991 | Streckert et al. |
| 5,068,154 A | 11/1991 | Mignani et al. |
| 5,116,679 A | 5/1992 | Nadkarni et al. |
| 5,135,895 A | 8/1992 | Frechette et al. |
| 5,182,077 A | 1/1993 | Feinroth |
| 5,190,737 A | 3/1993 | Weimer et al. |
| 5,202,105 A | 4/1993 | Boecker et al. |
| 5,230,848 A | 7/1993 | Wallace et al. |
| 5,238,711 A | 8/1993 | Barron et al. |
| 5,254,142 A | 10/1993 | Johansson et al. |
| 5,268,946 A | 12/1993 | Bryan et al. |
| 5,275,984 A | 1/1994 | Carpenter et al. |
| 5,294,489 A | 3/1994 | Luthra et al. |
| 5,304,397 A | 4/1994 | Holzl et al. |
| 5,324,494 A | 6/1994 | Glatzmier |
| 5,330,838 A | 7/1994 | Dyer et al. |
| 5,336,350 A | 8/1994 | Singh |
| 5,340,417 A | 8/1994 | Weimer et al. |
| 5,354,527 A | 10/1994 | Frechette et al. |
| 5,364,660 A | 11/1994 | Gabor et al. |
| 5,366,943 A | 11/1994 | Lipowitz et al. |
| 5,368,938 A | 11/1994 | Holzl et al. |
| 5,383,228 A | 1/1995 | Armijo et al. |
| 5,404,836 A | 4/1995 | Milewski |
| 5,434,897 A | 7/1995 | Davies |
| 5,436,042 A | 7/1995 | Lau et al. |
| 5,449,421 A | 9/1995 | Hamajima et al. |
| 5,460,637 A | 10/1995 | Connolly et al. |
| 5,501,906 A | 3/1996 | Deve |
| 5,547,512 A | 8/1996 | Gabor et al. |
| 5,552,352 A | 9/1996 | Brun et al. |
| 5,602,062 A | 2/1997 | Sato et al. |
| 5,618,510 A | 4/1997 | Okada et al. |
| 5,676,918 A | 10/1997 | Okada et al. |
| 5,814,840 A | 9/1998 | Woodall et al. |
| 5,922,300 A | 7/1999 | Nakajima et al. |
| 5,962,103 A | 10/1999 | Luthra et al. |
| 5,997,832 A | 12/1999 | Lieber et al. |

(56) References Cited

U.S. PATENT DOCUMENTS

| | | | |
|---|---|---|---|
| 6,022,515 | A | 2/2000 | Stole et al. |
| 6,024,898 | A | 2/2000 | Steibel et al. |
| 6,030,698 | A | 2/2000 | Burchell et al. |
| 6,040,008 | A | 3/2000 | Sacks |
| 6,110,279 | A | 8/2000 | Kito et al. |
| 6,113,982 | A | 9/2000 | Claar et al. |
| 6,261,509 | B1 | 7/2001 | Barnard et al. |
| 6,270,573 | B1 | 8/2001 | Kitabatake et al. |
| 6,316,051 | B2 | 11/2001 | Okada |
| 6,322,889 | B1 | 11/2001 | Lara-Curzio et al. |
| 7,041,266 | B1 | 5/2006 | Angier et al. |
| 7,083,771 | B2 | 8/2006 | Angier et al. |
| 7,125,514 | B2 | 10/2006 | Okamura et al. |
| 7,297,368 | B2 | 11/2007 | Williams |
| 7,341,702 | B2 | 3/2008 | Pultz et al. |
| 7,687,016 | B1 | 3/2010 | DiCarlo et al. |
| 7,700,202 | B2 | 4/2010 | Easier et al. |
| 8,940,391 | B2 | 1/2015 | Garnier et al. |
| 9,199,227 | B2 | 12/2015 | Garnier et al. |
| 9,272,913 | B2 | 3/2016 | Garnier et al. |
| 9,275,762 | B2 | 3/2016 | Garnier et al. |
| 9,340,460 | B2 * | 5/2016 | Courcot Mendez ........................ C04B 35/58078 |
| 9,463,489 | B2 * | 10/2016 | Allemand ........... C04B 41/4584 |
| 9,765,271 | B2 * | 9/2017 | Myrick .................... C06B 33/06 |
| 10,047,015 | B2 * | 8/2018 | Pegna ............... C04B 35/62865 |
| 10,435,820 | B2 * | 10/2019 | Garnier ..................... D01F 8/00 |
| 2002/0033545 | A1 | 3/2002 | Marlowe |
| 2002/0058107 | A1 | 5/2002 | Fareed et al. |
| 2004/0126306 | A1 | 7/2004 | Ochiai et al. |
| 2006/0039524 | A1 | 2/2006 | Feinroth et al. |
| 2006/0051281 | A1 | 3/2006 | Pradham et al. |
| 2006/0140838 | A1 | 6/2006 | Pultz et al. |
| 2006/0227924 | A1 | 10/2006 | Hallstadius et al. |
| 2007/0064861 | A1 | 3/2007 | Sterbentz |
| 2007/0138706 | A1 | 6/2007 | Metzger et al. |
| 2007/0248760 | A1 | 10/2007 | Chmelka et al. |
| 2009/0032178 | A1 | 2/2009 | Feinroth |
| 2009/0318280 | A1 | 12/2009 | Mohammadi et al. |
| 2010/0120604 | A1 | 5/2010 | Easler et al. |
| 2011/0135558 | A1 | 6/2011 | Ma et al. |
| 2012/0087457 | A1 | 4/2012 | Garnier et al. |
| 2012/0088088 | A1 | 4/2012 | Garnier et al. |
| 2013/0010914 | A1 | 1/2013 | Garnier et al. |
| 2013/0010915 | A1 | 1/2013 | Garnier et al. |
| 2013/0048903 | A1 | 2/2013 | Garnier et al. |

FOREIGN PATENT DOCUMENTS

| | | |
|---|---|---|
| EP | 0603888 | 6/1994 |
| JP | 50038700 | 4/1975 |
| JP | 06192917 | 7/1994 |
| JP | 2010143771 | 7/2010 |
| WO | WO9515564 | 6/1995 |
| WO | WO 2009046293 | 4/2009 |
| WO | WO 2012/048066 | 4/2012 |
| WO | WO 2012/048071 | 4/2012 |
| WO | WO 2013/070293 | 5/2013 |
| WO | WO 2014/049221 | 9/2013 |

OTHER PUBLICATIONS

U.S. Appl. No. 16/030,145, filed Jul. 9, 2018, Garnier, et al.
"Abradable Coatings used for Gas Path Seals in Turbine Engines." Vac Aero International, Inc. Web. Accessed Dec. 3, 2014. http://vacaero.com/information-resources/vac-aero-news-and-training/products-news-training/633-abradable-coatings-for-gas-path-seals-in-turbine-engines.html.
Al-Olayyan, Y., et al., The Effect of Zircaloy-4 Substrate Surface Condition on the Adhesion Strength and Corrosion of SiC Coatings, Journal of Nuclear Materials, 2005, pp. 109-119, vol. 346, Elsevier B.V.
"An Innovative Ceramic Corrosion Protection System for Zircaloy Cladding," Year 3—4th Quarter Report (+6), NERI Research Project No. DE-FG03-99SF21882, Feb. 2003.
Abstract Only Baskaran, et al. "Fibrous Monolithic Ceramics: III, Mechanical Properties and Oxidation Behavior of the Silicon Carbide/Boron Nitride System" Journal of the American Ceramic Society, vol. 77, Issue 5, May 1994, pp. 1249-1255.
Belitskus, David, "Fiber and Whisker Reinforced Ceramics for Structural Application", Technology & Engineering, pp. 81-83 and 86-90, 1993.
Bye et al., "Occurrence of airborne silicon carbide fibers during industrial production of silicon carbide," Scand J. Work Environ health 11 (1985) 111-15.
"Ceramic Fibers and Coatings: Advanced Materials for the Twenty-First Century" The National Academies Press, 1998, Chapter 6: Interfacial Coatings.
Chambers et al., "Development and Testing of PRD-66 Hot Gas Filters," DOE/ME/31214-97/C0734, Advanced Coal-Fired Power Systems '96 Review Meeting, Morgantown, West Virginia, Jul. 16-18, 1996, 8 pages.
Abstract Only Chen, et al. "Carbothermal Synthesis of Boron Nitride Coatings on Silicon Carbide" Journal of American Ceramic Society, Dec. 20, 2004.
Chiu et al. "SiC nanowires in large quantities: Synthesis, band gap characterization, and photoluminescence properties" Journal of Crystal Growth, 311 (2009) pp. 1036-1041.
Dacic et al., "Thermodynamics of gas phase carbothermic reduction of boron-anhydride," Journal of Alloyes and Compounds 413 (2006) 198-205.
Das, et al. "Carbothermal synthesis of boron nitride coating on PAN carbon fiber" Journal of the European Ceramic Society, vol. 29, Issue 10, Jul. 2009, pp. 2129-2134.
Dicarlo, et al. "SiC/SiC Composites for 1200 C and Above" Nasa/TM, Dec. 2004.
Ding, et al. "Dip-coating of boron nitride interphase and its effects on mechanical properties of SiCf/SiC composites" Materials Science and Engineering A, 2012.
Abstract Only Frueh, et al. "Carbon fiber reinforced ceramic matrix composites with an oxidation resistant boron nitride interface coating" Ceramics International, May 21, 2018.
Garnier, John, et al., Ex-Reactor Determination of Thermal Gap Conductance Between Uranium Dioxide and Zircaloy-4, Stage II: High Gas Pressure, Prepared for Nuclear Regulatory Commission, NUREG/CR-0330 PNL-3232, vol. 2, Jul. 1980, 78 pages.
Haibo et al., "Synthesis of a silicon carbide coating on carbon fibers by deposition of a layer of pyrolytic carbon and reacting it with silicon monoxide," Carbon 46 (2008) 1339-1344.
Abstract Only Han et al. "Continuous synthesis and characterization of silicon carbide nanorods" Chemical Physics Letters, vol. 265, Issues 3-5, Feb. 7, 1997, pp. 374-378.
Abstract Only Han "Anisotropic Hexagonal Boron Nitride Nanomaterials: Synthesis and Applications" Nanoteclmologies for the Life Sciences, Oct. 2010.
"Hexoloy SA Silicon Carbide, Technical Data," Saint-Gobain Advanced Cermics, 2003, 4 pages.
"Hi-Nicalon Ceramic Fiber," COI Ceramics, Inc., Jan 2006, 2 pages.
"Hi-Nicalon Type S Ceramic Fiber," COI Ceramics, Inc., Jan. 2006, 2 pages.
"High Performance Synthetic Fibers for Composites," National Materials Advisory Board, Commission on Engineering and Technical Systems, National Research Council, Publication NMAB-458, Apr. 1992, 142 pages.
Jayaseelan et at, "In Situ Formation of Silicon Carbide Nanofibers on Cordierite Substrates," J. Am. Ceram. Soc., 90 [5] 1603-1060 (2007).
Abstract Only Lamouroux, et al. "Oxidation-resistant carbon-fiber-reinforced ceramic-matrix composites" Composites Science and Technology, vol. 59, Issue 7, May 1999, pp. 1073-1085.
Legba "Synthesis and Characterization of a-Silicon Carbide Nanostructures" University of Kentucky Master's Theses 2007.

(56) References Cited

OTHER PUBLICATIONS

Abstract Only Li, et al. "Boron nitride coatings by chemical vapor deposition from borazine" Surface and Coatings Technology, Mar. 2011, 205(12) pp. 3736-3741.

Abstract Only Li, et al. "Preparation and characterization of boron nitride coatings on carbon fibers from borazine by chemical vapor deposition" Applied Surface Science, vol. 257, Issue 17, Jun. 15, 2011, pp. 7752-7757.

Li, et al. "Silicon-based Nanomaterials" Springer Series in Materials Science vol. 187, 2013.

Abstract Only Liu, et al. "Borazine derived porous boron nitride-boron nitride composites fabricated by precursor infiltration and pyrolysis" Ceramics International, 40(7) pp. 9235-9240.

Low, "Advances in Ceramic Matrix Composites" Jan. 20, 2018 pp. 12-15.

Abstract Only McFarland, et al. "Boria Fluxing of SiC in Ceramic Matrix Composite Aeropropulsion Applications" The Electrochemical Society, 2015.

Milewski, "Growth of Beta-Silicon Carbide Whiskers by the VLS Process", Journal of Materials Science 20, 1985, pp. 1160-1166.

Mortensen, Andrew, "Concise Encyclopedia of Composite Materials", Technology & Engineering, pp. 866-869, Dec. 8, 2003.

Abstract Only Mu, et al. "Effects of BN/SiC dual-layer interphase on mechanical and dielectric properties of SiCf/SiC composites" Ceramics International, Mar. 2014, 40(2), pp. 3411-3418.

Naslain, et al. "Fiber-Reinforced Ceramic Matrix Composites: State of the Art, Challenge and Perspective" Kompozyty (Composites) 5(2005)1, France.

Okada et el., "Preparation of Silicon Carbide Fiber from Activated Carbon Fiber and Gaseous Silicon Monoxide", Ceramic Engineering & Science Proceedings, 1995, pp. 45-54.

Okada et el., "Preparation of Silicon Carbide Fiber from Activated Carbon Fiber and Gaseous Silicon Monoxide", Communications of the American Ceramic Society, Jun. 1994, pp. 1691-1693.

Abstract Only Opila, "Oxidation and Volatilization of SiC in a Hydrogen-Rich Rocket Engine Environment" The Electrochemical Society, 2007.

Abstract Only Opila, et al. "High Temperature Degradation of BN-Coated SiC Fibers in Ceramic Matrix Composites" The Electrochemical Society, 2011.

Abstract Only Opila, et al. "Hot Corrosion of SiC/Bn/SiC Composites" The Electrochemical Society, 2015.

Abstract Only Opila, et al. "Molten Salt Corrosion of SiC Fibers" The Electrochemical Society, 2016.

PCT International Search Report and Written Opinion of the International Searching Authority for PCT/US11/55025, dated Feb. 27, 2012, 7 pages.

PCT International Search Report and Written Opinion of the International Searching Authority for PCT/US11/55031, dated Feb. 13, 2012, 10 pages.

PCT International Search Report and Written Opinion of the International Searching Authority for PCT/US12/50736, dated Jun. 10, 2013, 4 pages.

PCT International Search Report and Written Opinion of the International Searching Authority for PCT/US2018/041627 dated Sep. 26, 2018.

Ryan et al., "The Conversion of Cubic to Hexagonal Silicon Carbide as a Function of Temperature and Pressure" USAF, 1967.

Abstract Only Sabelkin, et al. "Fatigue and creep behaviors of a SiC/SiC composite under combustion and laboratory environments" Journal of Composite Materials, Aug. 27, 2015.

Abstract Only Sabelkin et al. "High-temperature thermal barrier-coated Sylramic-iBN/pyrolytic carbon/chemical vapor infiltration silicon carbide ceramic matrix composite behavior in a combustion environment" Journal of Composite Materials, Aug. 10, 2017.

Sacks, et al. "Silicon Carbide Fibers with Boron Nitride Coatings" in 24th Annual Conference on Composites, Advanced Ceramics, Materials, and Structures—B, Sep. 28, 2009, pp. 275-277.

Schricker, Bob, "Using Fiber Metal Abradable Seals in Aerospace Turbine Applications." Defense Tech Briefs. Technetics Group, EnPro Industries companies, Oct. 1, 2011. Web. Accessed Dec. 3, 2014. https://www.technetiscgroup.com/bin/AbradableSeals_AerospaceApplications.pdf.

Abstract Only Shen, et al. "Characterization of Dip-Coated Boron Nitride on Silicon Carbide Fibers" Journal of the American Ceramic Society, Apr. 1994.

Shi, et al. "Synthesis of Few-Layer Hexagonal Boron Nitride Thin Film by Chemical Vapor Deposition" American Chemical Society, 2010, vol. 10, pp. 4134-4139.

"Silar® SiC Whiskers for Ceramic Systems", www.acm-usa.com/Pages/Materials/details.apx?fsid=0, 1 pg.

Solozhenko, et al. "Refined Phase Diagram of Boron Nitride" Journal of Physical Chemistry B, 1999, vol. 103 pp. 2903-2905.

Abstract Only Sun et al. "Formation of Silicon Carbide Nanotubes and Nanowires via Reaction of Silicon (from Disproportionation of Silicon Monoxide) with Carbon Nanotubes" J. Am. Chem. Soc. 2002, 124(48), pp. 14464-14471.

Suzuki, et al. "Uniformization of Boron Nitride Coating Thickness by Continuous Chemical Vapor Deposition Process for Interphase of SiC/SiC Composites" Journal of the Ceramic Society of Japan, vol. 111, No. 12, pp. 865-871, 2003.

"Sylramic SiC Fiber," COI Ceramics, Inc., Jan. 2006, 2 pages.

Tan et al. "Properties of Silicon Carbide Nanotubes formed via Reaction of SiO Powder with SWCNTs and MWCNTs" IEEE Southeastcon 2009, Mar. 5-8, 2009.

"UBE Tyranno Fibers," Engineering Ceramics, 2005, 3 pages.

Wang, et al. "KD-S SiCf/SiC composites with BN interface fabricated by polymer infiltration and pyrolysis process" Journal of Advanced Ceramics, 2018, 7(2).

Abstract Only Wei, et al. "Synthesis of BN coatings on carbon fiber by dip coating" Surface and Interface Analysis, Jul. 29, 2016.

Wikipedia entry, "Activated Carbon", http://en.wikipedia.org/wiki/Activated_carbon, Accessed Sep. 25, 2013, 15 pages.

Wikipedia entry, "Vapor-liquid-solid method", http://en.wikipedia.org/wiki/Vapor-Liquid-Solid<method, Accessed Oct. 9, 2013, 7 pages.

Wilson, Scott, "Ensuring Tight Seals", Sulzer Innotec Abradable Test Facility. Sulzer Innotec, Feb. 2007. Web. Accessed Dec. 3, 2014. http://www.sulzer.com/en/-/media/Documents/Cross_Division/STR/2007/2007_2_23_wilson_e.pdf.

Wilson, "Oxidation of SiC/BN/SiC Ceramic Matrix Composites and their Constituents".

Wing "Residual Stresses and Oxidation of Silicon Carbide Fiber Reinforced Silicon Carbide Composites" A dissertation, University of Michigan, 2016.

Yang, et al., "Microstructure and Mechanical Properties of C/CeZrCeSiC Composites Fabricated by Reactive Melt Infiltration with Zr, Si Mixed Powders" in the Journal of Material Science Technologies, Aug. 2013, vol. 29, Issue 8, pp. 702-710.

Abstract Only Yang, et al."Processing-temperature dependent micro- and macro-mechanical properties of SiC fiber reinforced SiC matrix composites" Composites Part B: Engineering, vol. 129, Nov. 15, 2017, pp. 152-161.

Zhang et al. "Synthesis and Characterization of Crystalline Silicon Carbide Nanoribbons" Nanoscale Res. Lett. (2010) 5:1264-1271.

Abstract Only Zhou, et al. "Effects of dip-coated BN interphase on mechanical properties of SiCf/SiC composites prepared by CVI process" Transactions of Nonferrous Metals Society of China, May 2014, 24(5), pp. 1400-1406.

U.S. Appl. No. 12/901,309, Apr. 20, 2011, Restriction Requirement.
U.S. Appl. No. 12/901,309, Jun. 13, 2011, Office Action.
U.S. Appl. No. 12/901,309, Oct. 27, 2011, Final Office Action.
U.S. Appl. No. 12/901,309, Jan. 12, 2012, Advisory Action.
U.S. Appl. No. 12/901,309, Apr. 2, 2012, Office Action.
U.S. Appl. No. 13/215,967, Mar. 29, 2013, Restriction Requirement.
U.S. Appl. No. 12/901,309, Apr. 16, 2013, Final Office Action.
U.S. Appl. No. 13/215,967, Apr. 25, 2013, Office Action.
U.S. Appl. No. 12/901,326, Aug. 12, 2013, Restriction Requirement.
U.S. Appl. No. 12/901,309, Nov. 7, 2013, Office Action.
U.S. Appl. No. 12/901,326, Nov. 18, 2013, Office Action.
U.S. Appl. No. 13/215,967, Jan. 3, 2014, Final Office Action.
U.S. Appl. No. 12/901,309, Jun. 30, 2014, Office Action.

(56) References Cited

OTHER PUBLICATIONS

U.S. Appl. No. 12/901,326, Sep. 11, 2014, Final Office Action.
U.S. Appl. No. 12/901,309, Sep. 16, 2014, Notice of Allowance.
U.S. Appl. No. 13/215,967, Apr. 24, 2015, Office Action.
U.S. Appl. No. 12/901,326, May 15, 2015, Office Action.
U.S. Appl. No. 13/215,967, Jul. 29, 2015, Notice of Allowance.
U.S. Appl. No. 14/570,927, Oct. 20, 2015, Notice of Allowance.
U.S. Appl. No. 12/901,326, Oct. 26, 2015, Notice of Allowance.
U.S. Appl. No. 14/615,685, Jan. 26, 2017, Office Action.
U.S. Appl. No. 14/615,685, Jun. 30, 2016, Notice of Allowance.
U.S. Appl. No. 14/954,518, Aug. 30, 2017, Office Action.
U.S. Appl. No. 14/954,518, May 18, 2018, Office Action.
U.S. Appl. No. 14/954,518, Oct. 12, 2018, Notice of Allowance.
U.S. Appl. No. 15/795,619, Dec. 31, 2018, Office Action.

\* cited by examiner

METHODS FOR PRODUCING METAL CARBIDE MATERIALS

CROSS-REFERENCE TO RELATED APPLICATIONS

The present application is a continuation-in-part of continuation-in-part of U.S. patent application Ser. No. 14/954,518, filed Nov. 30, 2015, entitled "BORON CARBIDE FIBER REINFORCED ARTICLES", which is a continuation-in-part of U.S. patent application Ser. No. 13/215,967, now U.S. Pat. No. 9,199,227, filed Aug. 23, 2011, entitled "METHODS OF PRODUCING CONTINUOUS BORON CARBIDE FIBERS, CONTINUOUS BORON CARBIDE FIBERS, CONTINUOUS FIBERS COMPRISING BORON CARBIDE, AND ARTICLES INCLUDING FIBERS COMPRISING AT LEAST A BORON CARBIDE COATING". U.S. patent application Ser. No. 14/954,518 is also a continuation-in-part of U.S. patent application Ser. No. 12/901,326, now U.S. Pat. No. 9,275,762, filed Oct. 8, 2010, entitled "CLADDING MATERIAL, TUBE INCLUDING SUCH CLADDING MATERIAL, AND METHODS OF FORMING THE SAME". U.S. patent application Ser. No. 14/954,518 is also a continuation-in-part of U.S. patent application Ser. No. 14/570,927, now U.S. Pat. No. 9,272,913, filed Dec. 15, 2014, entitled "METHODS FOR PRODUCING SILICON CARBIDE FIBERS", which is a divisional of U.S. patent application Ser. No. 12/901,309, filed Oct. 8, 2010, now U.S. Pat. No. 8,940,391, entitled "SILICON CARBIDE FIBERS AND ARTICLES INCLUDING SAME". U.S. patent application Ser. No. 14/954,518 is also a continuation-in-part of U.S. patent application Ser. No. 14/615,685, now U.S. Pat. No. 9,803,296, filed Feb. 6, 2015, entitled "METAL CARBIDE FIBERS AND METHODS FOR THEIR MANUFACTURE, which claims the benefit of U.S. Provisional Patent Application Ser. No. 61/941,001, filed Feb. 18, 2014, entitled "FABRICATION OF CONTINUOUS METAL CARBIDE FIBERS". The disclosure of each of the above patents and applications is herein incorporated by reference in its entirety.

STATEMENT REGARDING FEDERALLY SPONSORED RESEARCH OR DEVELOPMENT

This invention was made with government support under Contract Number DE-AC07-05ID14517 awarded by the United States Department of Energy. This invention was also made with government support under U.S. Department of Navy, Officer of Naval Research, Small Business Innovation Research (SBIR) Phase I, Contract No. Contract No. N0001414P1130 and U.S. Department of Navy, Office of Naval Research, SBIR Phase II, Contract No. N0001416C2020. The government has certain rights in the invention.

TECHNICAL FIELD

The invention, in various embodiments, relates generally to methods of producing silicon carbide, as well as other metal carbides.

BACKGROUND

Silicon carbide fiber is used to provide mechanical strength at high temperatures to fibrous products, such as high temperature insulation, belting, gaskets, or curtains, or as reinforcements in plastic, ceramic, or metal matrices of high performance composite materials. To provide mechanical strength to these products or materials, the silicon carbide has relatively fine grain sizes and low density, one third as compared to steel. Silicon carbide is also used in advanced nuclear fuel elements to provide mechanical stability and higher thermal conductivity to the oxide based fuel. The silicon carbide can also function as a diffusion barrier to the release of fission products.

Silicon carbide exists in approximately 250 crystalline forms, including the alpha polymorph or polytype and the beta polymorph, each of which has a different crystal structure. Silicon carbide is commercially available in many forms, such as powders or particulates, fibers, whiskers, or cloth, depending on the polymorph. Alpha silicon carbide has a hexagonal crystal structure and a decomposition temperature of approximately 2730° C. Alpha silicon carbide is conventionally manufactured as a powder on a large scale for use in monolithic (non-fiber) silicon carbide products. Monolithic forms of alpha silicon carbide are known in the art, such as HEXOLOY® SA silicon carbide from Saint-Gobain Advanced Ceramics (Niagara Falls, N.Y.). HEXOLOY® SA silicon carbide exhibits reliable performance in air at temperatures greater than 1900° C. and is used at temperatures of at least 2200° C. in inert environments.

Monolithic (non-fiber) forms of alpha silicon carbide contain no alpha silicon carbide fibers or beta silicon carbide fibers. The HEXOLOY® SA silicon carbide is produced by pressureless sintering of silicon carbide powder. One known process of forming monolithic alpha silicon carbide is to heat sub-micron alpha silicon carbide powder formed by the Acheson process to a temperature of 2200° C. and pressureless sinter the alpha silicon carbide powder into a product shape using sintering aids, such as boron or calcium. Another process for forming monolithic alpha silicon carbide is the Lely process, in which silicon carbide powder is sublimated in an argon atmosphere at a temperature of 2500° C. and re-deposited into single crystals. Monolithic alpha silicon carbide may also be formed by reaction bonding silicon and carbon powder, or by chemical vapor deposition (CVD) using gases such as silane ($SiH_4$), propane ($C_3H_8$), or more complex gases to form a coating.

Beta silicon carbide has a cubic or zinc blende crystal structure. The silicon carbide composite industry is based on the use of beta silicon carbide fibers in a beta silicon carbide matrix. The crystalline structure of the matrix is the same as the crystalline structure of the fibers to maintain phase stability at elevated temperatures. Beta silicon carbide fibers are commercially available, such as SYLRAMIC® silicon carbide fibers from COI Ceramics, Inc. (San Diego, Calif.), HI-NICALON™ ceramic fibers and HI-NICALON™ type S ceramic fibers from Nippon Carbon (Tokyo, Japan) and distributed through COI Ceramics, Inc (San Diego, Calif.), and TYRANNO FIBER® from Ube Industries, Ltd. (Tokyo, Japan). Beta silicon carbide fibers are used with the beta silicon carbide matrix in ceramic matrix composites (CMCs).

However, CMCs including the beta silicon carbide matrix and beta silicon carbide fibers have limited temperature use due to fiber degradation. These CMCs may be used for short times at a temperature up to 1400° C. or may be used continuously at a temperature below 1200° C. Beta silicon carbide particulate powder is conventionally produced by the Acheson process in which silicon dioxide and carbon are reacted in an electric resistor furnace at a temperature between 1600° C. and 2500° C. The beta silicon carbide may also be formed by the conversion of silicon monoxide and carbon into fibers of beta silicon carbide. The commercially available fibers of beta silicon carbide are produced using a pre-ceramic polymer conversion route enabling extrusion of continuous fibers, followed by high temperature sintering in a controlled atmosphere to about 1600° C.

Other processes of producing beta silicon carbide require chemical reaction of the carbon using oxygen to enhance silicon dioxide or silicon monoxide reaction with the carbon. Moreover, attempts to make alpha silicon carbide fibers by these processes have not been successful as further heat treatment of the formed beta silicon carbide fibers causes the fibers to lose thermal and mechanical properties at temperatures above 1700° C., and heating to effect crystalline conversion (from beta to alpha) results in significant mechanical property degradation.

It would be desirable to produce fibers of alpha silicon carbide for use in a variety of high temperature and composite applications. It would also be desirable to produce the alpha silicon carbide fibers in an economical manner. It would be a further advantage if such methods were also adaptable to produce other forms of silicon carbide (e.g., nanoparticles), whether the alpha polymorph, beta polymorph, or otherwise. It would also be advantageous if such methods were adaptable to production of other metallic carbides, whether in fiber or other form (e.g., nanoparticles), as well.

BRIEF SUMMARY

The present disclosure relates not only to methods of producing silicon carbide and other metal carbide materials in fiber form, but extends such methods to additional feedstock forms of carbon, to provide alternative manufacturing methods for producing nanoparticle metal carbide materials in various other forms, (e.g., powders, platelets, foams, nanotubes, nanorods, whiskers, and the like), using similar process conditions for manufacture.

In addition to suitability for use in producing various polymorphs of silicon carbide, the present disclosure also describes a conversion process for producing other metal carbides, starting with carbon material (e.g., in fiber, nanofilament, nanoparticle or other form) to produce partially or fully converted metal carbide materials.

An embodiment of the present disclosure includes a method of producing silicon carbide fibers, other silicon carbide materials, or other metal carbides. To produce silicon carbide, the method comprises reacting a carbon material and a silicon-containing gas in a reaction chamber at a temperature of up to approximately 2400° C. (e.g., ranging from approximately 1500° C. to approximately 2000° C. to produce alpha SiC). A partial pressure of oxygen in the reaction chamber is maintained at less than approximately $1.01 \times 10^2$ Pascal to produce a desired polymorph of silicon carbide. The basic processing conditions of temperature and pressure can also be used to produce other metallic carbide materials, e.g. For example, temperature may be varied somewhat, affecting the polymorph that forms. For example, at somewhat lower temperatures than used to produce alpha SiC, beta SiC can be formed. Different metallic carbides can be formed using a similar process, by using a gaseous reactant that includes a material other than silicon (e.g., boron containing, to produce boron carbide, or various other metal-containing gases to produce their associated metal carbides). Such methods may be based in principle on the earlier work and processes of the Applicant relative to silicon carbide and boron carbide production, but Applicant has discovered that such processes can be adapted to production of various other metallic carbides, in not only fiber form (which is the subject of Applicant's U.S. Pat. No. 9,803,296), but these processes can also be used to produce the same metallic carbide materials, in forms that may include non-fiber forms (e.g., nanoparticles, such as powders, platelets, foams, nanorods, nanotubes, whiskers, etc.).

One embodiment of the present disclosure includes a method of producing silicon carbide material. The method comprises positioning a carbon material into a reaction zone of a reaction chamber, the reaction zone comprising silicon dioxide, silicon, and a carrier gas. The reaction zone comprising the silicon dioxide, silicon, and a carrier gas is heated to a temperature ranging from approximately 1600° C. to approximately 1800° C. while maintaining a partial pressure of oxygen of less than approximately $1.01 \times 10^2$ Pascal in the reaction zone to produce alpha silicon carbide. The form of the produced alpha silicon carbide depends on the form of the starting carbon material. For example, where the starting carbon material is a carbon fiber, the resulting alpha silicon carbide is also in fibrous form. Where the starting carbon material is in some form of nanoparticle or other form (e.g., powder, platelets, whiskers, foam, nanofiber, nanotube, nanorod, etc.), the resulting alpha silicon carbide will be in a form corresponding to the form of the starting carbon material.

Where reaction time is limited, the result can be a configuration where only a portion of the starting carbon material is converted to carbide. For example, the product may include a conversion layer of alpha or other silicon carbide over the starting carbon material (present as a core). With further reaction time, the starting carbon material can be substantially fully converted to the metallic carbide.

BRIEF DESCRIPTION OF THE SEVERAL VIEWS OF THE DRAWINGS

While the specification concludes with claims particularly pointing out and distinctly claiming that which is regarded as the present invention, the advantages of embodiments of the disclosure may be more readily ascertained from the following description when read in conjunction with the accompanying drawings in which:

DETAILED DESCRIPTION

I. Silicon Carbide Embodiments

Figure 1:
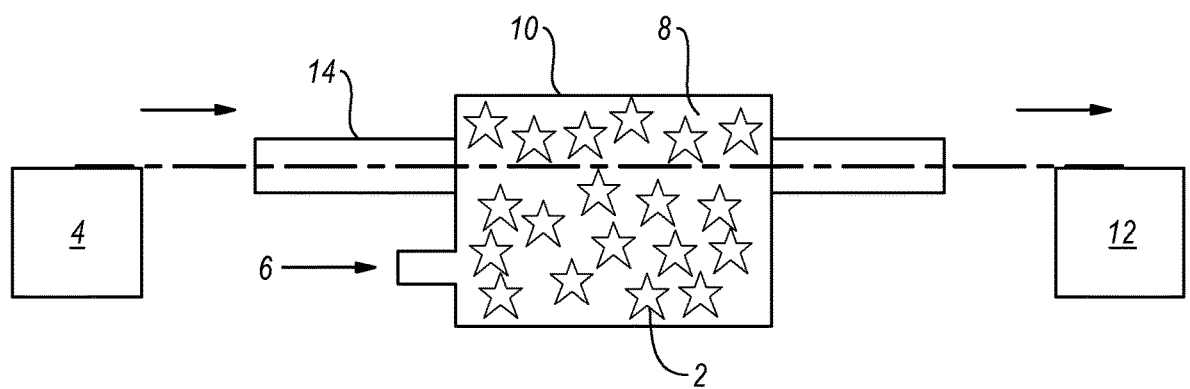
FIG. 1 is a schematic illustration of a reaction chamber utilized in a method to form alpha or other silicon carbide materials, or other metal carbide materials, according to embodiments of the disclosure.

Methods of forming alpha and other polymorphs of silicon carbide are disclosed, as are articles that may include such materials. Methods of forming carbides other than silicon carbide area also disclosed (e.g., various other metallic carbides), as well as articles that may include such materials. Embodiments already disclosed in Applicant's patents and applications include methods for converting continuous, as well as discontinuous (e.g., chopped) carbon fibers into silicon carbide or other metallic carbides. The present disclosure extends such methods to other carbon feedstocks, e.g., to produce silicon carbide nanoparticles, other metallic carbide nanoparticles, and the like, through a simple, economical process. As used herein, the term "continuous fibers" means and includes fibers that may be formed or manufactured to an indefinite length and, thus, are not process-constrained to any particular length other than a length of carbon fiber material feedstock employed. The continuous fibers may be of a sufficient length to be woven or braided into an article or product. By way of example, the continuous fibers may have a length ranging from approximately five centimeters to a length of greater than or equal to approximately one meter. The term "continuous fibers" is used in contrast to discontinuous fibers, which have a discrete length, such as a length of less than approximately five centimeters. Continuous silicon carbide or other metallic carbide fibers may be directly formed from a carbon fiber material.

Different forms of starting carbon feedstock material (e.g., other than fibers) can be used to produce chemically identical or similar materials (e.g., alpha silicon carbide, beta silicon carbide, boron carbide, and other metallic carbides) using a similar conversion method, but in which the carbon feedstock material is replaced with another material (e.g., carbon powder, carbon platelets, carbon foam, carbon nanofiber, carbon nanorods, carbon nanotubes, carbon whiskers, graphene, fullerenes, hydrocarbons, or the like), which carbon feedstock material can be converted under similar conditions to a desired silicon carbide (e.g., alpha silicon carbide, beta silicon carbide), boron carbide, or another metallic carbide. As with the conversion processes in which the carbon feedstock material is in fiber form, the resulting carbide that is formed has a similar physical form as the starting carbon feedstock material.

For example, where carbon nanoparticles are used as the starting feedstock, the resulting carbide product will be in nanoparticle form, where carbon powder is used as the starting feedstock, the resulting carbide product will be in powder form, where carbon platelets are used as the starting feedstock, the resulting carbide product will be in platelet form, where carbon foam is used as the starting feedstock, the resulting carbide product will be in foam form, where carbon nanofibers are used as the starting feedstock, the resulting carbide product will be in nanofiber form, where carbon nanorods are used as the starting feedstock, the resulting carbide product will be in nanorod form, where carbon nanotubes are used as the starting feedstock, the resulting carbide product will be in nanotube form, where carbon whiskers are used as the starting feedstock, the resulting carbide product will be in whisker form, where carbon graphene "2D" sheets are used as the starting feedstock, the resulting carbide product will be in similar "2D" sheet form, where carbon fullerenes having a "buckyball" "3D" geometric form are used as the starting feedstock, the resulting carbide product will retain that "buckyball" "3D" geometric form, and where a porous carbon is used as the starting feedstock, the resulting carbide product will be in similar porous, high surface area form.

As used herein, the term "directly formed" means and includes formation of the silicon carbide or other metallic carbide material from the starting carbon material without additional post-processing acts. By adjusting temperature, reaction time, and atmospheric conditions under which the reaction is conducted, silicon carbide and other metallic carbide materials may be formed, by converting the carbon feedstock material to a desired metallic carbide. The produced silicon carbide or other metallic carbide materials may be used as a matrix material (e.g., nanoparticles) to form articles, such as CMCs. The silicon carbide or other metallic carbide materials may have a size ranging from approximately 1 nm or larger (e.g., up to 10,000 nm).

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is typically used in preference to the more restrictive term "is" so as to avoid any implication that other, compatible materials, structures, features and methods usable in combination therewith should or must be, excluded.

By way of example, alpha and other polymorphs (e.g., beta) of silicon carbide may be formed by reacting a silicon-containing gas (g) and a solid carbon material (s) in the presence of a carrier gas as shown in Reaction 1:

Silicon-containing gas+carbon material(s)+carrier gas→silicon carbide(s)+carbon monoxide(g)+ carrier gas The reaction is a gas-solid phase reaction that results in the production of the silicon carbide material by an irreversible surface chemical exchange reaction between the carbon starting material and the silicon-containing gas. Reaction 1 is thermodynamically and kinetically driven and proceeds as a function of the reaction temperature and reaction time. Reaction temperature also affects which polymorph of silicon carbide is formed. For example, at relatively higher temperatures, the alpha polymorph is favored and will form, while at lower temperatures under otherwise similar conditions, the beta polymorph is favored and will form. Since the reaction to form the silicon carbide material is a gas-solid phase deposition (more accurately a conversion) reaction, the reaction may be conducted without a sintering aid, which reduces impurities in the silicon carbide material. Sintering aids are utilized in conventional processes of producing alpha or beta silicon carbide monolithic ceramics to densify the silicon carbide material.

In addition to the silicon carbide material, carbon monoxide (CO) is produced in Reaction 1. The carbon monoxide may be removed from a reaction chamber or furnace in which the reaction is conducted by the flow of the carrier gas. The presence of carbon monoxide in the reaction chamber may affect the time and temperature kinetics of the reaction to form the silicon carbide material. The silicon-containing gas utilized in Reaction 1 may be a high purity gas, such as silicon monoxide (SiO). The carrier gas utilized in Reaction 1 may be an inert gas including, but not limited to, argon, helium, neon, xenon, or combinations thereof. The inert gas may be used to maintain a low partial pressure of oxygen ($PO_2$) in the reaction chamber in which the reaction is conducted. The inert gas may also be used to remove gaseous byproducts of the reaction, such as carbon monoxide. In one embodiment, the carrier gas is argon.

The carrier gas may have a low residual oxygen content ($PO_2$), a low nitrogen content ($PN_2$), and a low water content ($PH_2O$), with each species at a relative partial pressure of less than approximately $1.01 \times 10^2$ Pascal (0.001 atm). Each of the oxygen, nitrogen, or water in the carrier gas may be present at a concentration of less than approximately 1000 parts per million (ppm). The carrier gas may also be a mixture of carbon monoxide and carbon dioxide, which includes a low concentration of oxygen, nitrogen, and water vapor, and may be used to produce a low oxygen partial pressure over the temperature ranges of the process (up to $PO_2=1\times10^{-21}$ atm). As mentioned above, the temperature of the process may be selected based on what polymorph is desired. The process described here in the context of producing a silicon carbide material can be adjusted to similarly convert the starting carbon material into a metallic carbide other than silicon carbide, by using a different reactant gas, as will be described in additional detail below.

The carrier gas may also be a combination of an inert gas and a mixture of carbon monoxide and carbon dioxide. By utilizing a carrier gas of high purity, the resulting silicon carbide material may include low concentrations of oxygen and nitrogen, which if present at high concentrations in the silicon carbide material may have a negative effect in lowering both thermal and mechanical properties and may be a source of material swelling during irradiation. In contrast, conventional processes of producing silicon carbide materials that utilize sintering aids result in significant concentrations of oxygen and nitrogen impurities in the carbide materials, which affect the high temperature performance of the material. For example, oxygen, nitrogen, or other impurities may be maintained at less than 10 ppm, less than 5 ppm, or less than 1 ppm.

In one embodiment, the silicon-containing gas is silicon monoxide and the carrier gas is argon, and the silicon carbide material is formed according to Reaction 2:

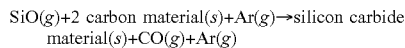
$SiO(g)+2$ carbon material$(s)+Ar(g)\rightarrow$silicon carbide material$(s)+CO(g)+Ar(g)$ To generate the silicon monoxide, silicon dioxide ($SiO_2$) and silicon (Si) are reacted according to Reaction 3:

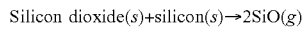
Silicon dioxide$(s)$+silicon$(s)\rightarrow 2SiO(g)$

The silicon dioxide ($SiO_2$) and silicon (Si) may be heated in the reaction chamber in which Reaction 1 or Reaction 2 is to be conducted. The amount of silicon monoxide generated within the reaction chamber may depend on the amount of silicon dioxide and silicon used. Each of the silicon dioxide and the silicon may be a high purity powder commercially available from a chemical supply company, such as from Sigma-Aldrich Co. (St. Louis, Mo.). The silicon dioxide and the silicon may be placed in a container, such as in a boat, in the reaction chamber and the reaction chamber heated to a temperature greater than approximately 600° C. Such boats or other containers may similarly be used to convey the starting carbon materials in whatever form, through the reaction zone of the tube furnace. In the case of carbon fiber starting materials, the fiber may simply be tensioned and drawn through the reaction zone.

Alternatively, the silicon dioxide and silicon may be continuously added to the container in the reaction chamber, enabling a continuous source of the silicon monoxide and continuous conversion of the carbon material into the silicon carbide material. The silicon monoxide may be produced in the same reaction chamber in which Reaction 1 or Reaction 2 is to be conducted. However, the silicon monoxide may also be produced in a separate reaction chamber or furnace and introduced into the reaction chamber containing the starting carbon material.

The vapor pressure of silicon monoxide species produced in the reaction chamber may be maintained at less than or equal to approximately 1 atm at the highest process temperature (e.g., approximately 1750° C.) within the reaction chamber. When Reactions 2 and 3 are conducted at a low partial pressure of oxygen and a high temperature, silicon monoxide gas may be produced. While other methods of producing silicon monoxide are known, in one embodiment, the silicon monoxide is produced as described in Reaction 3 because no secondary gases are produced. For instance, when silicon dioxide and hydrogen gas are reacted to produce silicon monoxide, water is formed as a byproduct of the reaction. The presence of excess hydrogen in the reaction chamber may provide a source of impurities in the produced materials as described previously in regard to oxygen and nitrogen impurities from sintering aids. As described above, it may similarly be advantageous to ensure hydrogen impurities in the produced metallic carbide do not exceed a similar threshold (e.g., 1 ppm).

The carbon material used in Reaction 1 or Reaction 2 may be a carbonaceous material that has microscopic crystals axially aligned in long chains, such as a polyaromatic hydrocarbon (pitch resin) or a polyacrylonitrile (PAN) processed carbon. The carbon material may also include carbon nanotubes, or any of various other possible starting material forms (e.g., nanoparticles, powder, platelets, foams, nanofibers, nanorods, whiskers, graphene, fullerenes, hydrocarbons, or the like). It will be apparent that a wide variety of starting carbon materials may be suitable for use in the direct conversion process.

The carbon material may be substantially pure in that the material predominantly includes carbon and hydrogen. By way of example, the carbon material may have a purity of greater than approximately 99.5%. To prevent the formation of laterally extending whiskers growing off a base structure of the carbon starting material, minimal impurities (on the order of less than parts per million (ppm)), such as iron, may be present in the carbon starting material. Such impurities may act as nucleation sites, where growth of whiskers may occur laterally outward from the carbon starting material.

The carbon material may be relatively inexpensive. In addition, large quantities of the starting carbon material may be commercially available. The carbon material may include a mixture of carbon-carbon single bonds, carbon-carbon double bonds, and carbon-carbon triple bonds. To provide a desired degree of reactivity, the carbon material may include a greater proportion of carbon-carbon single bonds and carbon-carbon double bonds relative to carbon-carbon triple bonds.

Examples of carbon fiber materials that can be used as feedstocks are available from KUREHA Corporation (Tokyo, Japan) under the name SY-652 pitch based carbon yarn or from Mitsubishi Chemical U.S.A., Inc. (Tokyo, Japan) under the DIALEAD® tradename, such as DIALEAD® KS352U pitch-based carbon fibers. A carbon fiber material may also be a PAN-based carbon fiber, such as AS4C-GP and AS2C-GP or other carbon fibers available from HEXCEL Corporation (Salt Lake City, USA), T300 or other carbon fibers available from Toray Carbon Fibers America, Inc. (Santa Ana, Calif.), or SGL SIGRAFIL® carbon fibers available from SGL Carbon Fibers Ltd. (Gardena, Calif.).

Examples of various carbon starting materials that may be commercially available, which could be used as the contemplated starting materials that may be in powder, platelet, foam, nanofiber, nanorod, nanotube, whisker, graphene, fullerene, hydrocarbon forms or other forms may include carbon powders and platelets of various sizes and levels of purity available from commercial vendors such as Cabot Corp. (Billerica, Mass.), Saint Gobain (Malvern, Mass.) and/or Sigma-Aldrich (St. Louis, Mo.). Carbon foams may be available from companies such as ERG Materials and Aerospace, Corp. under the trade name Duocel® or from CFOAM, LLC (Tridelphia, W. Va.) under the trade name CFOAM®. Graphene may be obtained from various manufacturers, such as NanoXplore (Montpellier, Montreal, QC) under the trade name GrapheneBlack™. Graphene and other carbon nano-materials may also be obtained from manufacturers such as ACS Material, LLC (Pasadena, Calif.). It will be apparent that numerous possible sources for the various starting materials are readily available.

The reaction to form the silicon carbide material may be conducted in a reaction zone of the reaction chamber, which is described in more detail below. The silicon-containing gas, the carbon material, and the carrier gas may be introduced into the reaction zone of the reaction chamber. The silicon-containing gas may be flowed into the reaction chamber or, if the silicon-containing gas is generated in situ from solid precursors, the solid precursors may be placed in the reaction chamber. The carbon material may be conveyed through the reaction zone of the reaction chamber or furnace, which is described in more detail below in regard to FIG. 1.

Reaction 2 may occur as the carbon material is drawn or otherwise conveyed into the reaction chamber containing the SiO(g). The carrier gas may flow into the reaction chamber at a sufficient flow rate to achieve the desired gaseous environment within the reaction chamber. The flow rate of the carrier gas at standard temperature and pressure conditions may range from approximately 0.001 $m^3$/min to approximately 0.01 $m^3$/min. Flow rate may of course also depend on the size of the reaction chamber, where a larger reaction chamber may employ greater flow rates. The reaction zone of the reaction chamber may be maintained at an elevated temperature sufficient for the silicon-containing gas and the carbon material to react, such as at a temperature between approximately 1100° C. and approximately 2400° C., such as from approximately 1500° C. to approximately 2000° C., for alpha silicon carbide production. Even lower temperatures (e.g., 600° C. and up) may be appropriate, depending on the particular metallic carbide being produced (i.e., metallic carbides other than silicon carbide). By way of example relative to production of silicon carbide materials, a temperature range of 1500° C. to 1800° C. may be particularly appropriate for producing alpha silicon carbide, and a temperature range of 1100° C. to 1450° C. may be particularly appropriate for producing beta silicon carbide.

To obtain the alpha polymorph of the silicon carbide, the temperature in the reaction chamber may be greater than or equal to approximately 1600° C., such as approximately 1800° C. During the reaction, the reaction chamber may be substantially free of oxygen gas. The partial pressure of oxygen in the reaction zone may be maintained at less than or equal to approximately $1.01 \times 10^2$ Pascal (less than or equal to approximately 0.001 atm), such as by minimizing the oxygen content in the carrier gas. The partial pressure of oxygen may also be controlled using gas mixtures, such as a mixture of carbon monoxide and carbon dioxide instead of or in addition to the carrier gas. By adjusting the ratio of $PCO/PCO_2$ and the reaction temperature, the residual oxygen partial pressure in the reactant chamber may be as low as approximately $1 \times 10^{-21}$ atm at 1600° C. Such low partial pressures of oxygen and other undesirable species in the reaction chamber are also applicable to production of beta silicon carbide, as well as other (non-silicon) metallic carbides.

Utilizing the mixture of carbon monoxide and carbon dioxide may further lower the partial pressure of oxygen, thus generating more silicon monoxide at a lower temperature. If the partial pressure of oxygen during the reaction to produce the silicon carbide material is too high, excess oxygen may react with the carbon material, consuming the carbon material. Since the reaction of oxygen with the carbon material is thermodynamically favored compared to the reaction of silicon monoxide with the carbon material, the amount of free oxygen present in the reaction chamber may be minimized. During the direct conversion reaction, the partial pressure of the silicon-containing gas may be greater than the partial pressure of the oxygen.

The carbon material may be reacted with the silicon-containing gas in the reaction zone. The carrier gas may be used to control the gaseous environment in the reaction zone by enabling continuous removal of excess carbon monoxide, produced by the reaction, from the reaction chamber. By continuously removing the carbon monoxide from the reaction chamber, secondary gaseous reactions between the silicon monoxide and carbon monoxide are not favored, which enables the concentration of the carbon material to be maintained at less than or equal to approximately 50 atomic %, thus favoring the formation of the silicon carbide. As the reaction is a continuous process within the reaction zone of the reaction chamber, both the carbon material and the silicon-containing gas may be continuously replenished depending on the rate of conveyance (inches per minute) of the carbon material through the reaction zone and the length of the reaction zone.

During the reaction, as the diffusion of silicon in silicon carbide is lower than the diffusion of carbon in silicon carbide, carbon may diffuse out of the carbon material while silicon from the silicon-containing gas may diffuse into the carbon material and react with the carbon, forming the silicon carbide material of the desired polymorph. With continuous carbon monoxide removal from the reaction surface, the chemical reaction kinetics may favor diffusion of the silicon inward into the carbon material and diffusion of carbon outward from the carbon material. The diffusion of the silicon and carbon may continue as approximately 50% of the carbon diffuses outward from the interior of the carbon material and is removed as carbon monoxide. Concurrently, the silicon diffusing into the carbon material may react with the carbon-carbon single bonds, the carbon-carbon double bonds, and the carbon-carbon triple bonds to form the alpha or other desired polymorph silicon carbide material.

During the reaction, the resulting formation of silicon carbide material may exhibit a volumetric expansion of up to approximately 2%. Due to a high surface area of the carbon material, the reaction may proceed to completion in an amount of time ranging from approximately seconds to approximately minutes, such as less than approximately 10 minutes. The direct conversion process is therefore advantageously and easily tailored to a "continuous" (rather than "batch") chemical process, although batch production is also of course possible. Reaction time may vary depending on the reaction temperature, the particular metal carbide being formed, etc. The single bonds between carbon-carbon atoms of the carbon material may be readily broken, while surprisingly, the breaking of double bonds and triple bonds (containing $\pi$ bonds) may proceed at a slower rate.

Without being bound by a particular theory, as the carbon-carbon bonds of the carbon material break, reaction with a silicon atom from the silicon-containing gas occurs, resulting in formation and growth of sub-micron grains of the desired polymorph of silicon carbide within the carbon material. Within individual layers, filaments, or other structures of the carbon material, the different, yet repeating, carbon-carbon bonds may be distributed in a manner such that at complete conversion, the silicon carbide material may include sub-micron size silicon carbide grains. In the case of fibers, the fine silicon carbide grain structure is believed to provide individual filaments of the alpha silicon carbide fibers with mechanical strength.

By maintaining approximately the same stoichiometric ratio of silicon and carbon (Si/C=1) during the reaction and elevated temperature conditions favoring formation of the alpha crystalline polymorph, the alpha polymorph of silicon carbide may be formed. However, if the processing conditions in the reaction chamber are adjusted to a lower reaction temperature, the beta polymorph of silicon carbide may be produced.

Alpha silicon carbide materials produced by the method of the present disclosure may exhibit a green iridescent color in visible light, in contrast to the more black color of beta silicon carbide materials. Other methods to confirm the presence of an alpha or beta crystalline structure may also be used, such as x-ray spectroscopy and laser Raman spectroscopy. Formation of alpha versus beta silicon carbide polymorph material by the method of the present disclosure may be confirmed visually. The silicon carbide material produced by the method of the present disclosure may predominantly include either the alpha or the beta polymorph of silicon carbide, such as including greater than approximately 99% of alpha given polymorph. It is of course also possible to produce materials that include a blend of the two, if such were desired.

Depending on the extent to which the reaction proceeds, the carbon material may be fully converted or partially converted into the desired polymorph of silicon carbide. By adjusting the conditions within the reaction zone, such as the reaction temperature or reaction time, the silicon carbide materials that are formed may be on a continuum of partially converted silicon carbide material to fully converted silicon carbide material. If the reaction conditions are such that the reaction proceeds to substantial completion, fully dense or fully converted silicon carbide material may be formed. The fully converted silicon carbide material may have a density of approximately 3.21 g/cc in the case of alpha or beta silicon carbide. As a result of such conversion, the converted material exhibits a silicon-carbon bond length that is greater than the carbon-carbon bond length (of the unconverted material).

The general theoretical density of boron carbide may be from 2.1-2.7 g/cm$^3$. Titanium carbide may be 4.93 g/cm$^3$. Hafnium carbide may be 12.20 g/cm$^3$. tantalum carbide may be 14.3 g/cm$^3$. Other theoretical values may be available in the literature. While the foregoing densities are theoretical, actual measured densities for converted metallic carbide materials produced using the present direct conversion techniques may often result in an actual density that is somewhat less than the theoretical values (e.g., within 1%, within 2%, within 3%, within 5%, or within 10% of the theoretical density).

As the reaction proceeds, the silicon carbide material may exhibit minimal dimensional changes in diameter, length, or other measured size relative to the diameter, length or other measured size of the starting carbon material. In contrast, alternative processes for production of beta-silicon carbide (e.g., fibers) have included process-induced dimensional changes to the diameter, length or other measured size of a starting fiber or other starting carbon material form. Since the silicon carbide material formed by the present direct conversion process exhibits minimal shrinkage and forms fine sub-micron silicon carbide grains, the silicon carbide materials exhibit desirable properties for use as a high performance silicon carbide material.

When forming fully converted alpha silicon carbide material, greater than approximately 99.8% of the carbon from the starting carbon material may be reacted with the silicon from the silicon-containing gas. The reaction may proceed until substantially all of the carbon is converted, unless a partial conversion is desired, and the silicon carbide material may be removed from the reactant zone (e.g., conveyed in "boats" into and then out of the reaction zone after a desired "dwell" time, to achieve a desired degree of conversion). As the diffusion of silicon in silicon carbide is lower than the diffusion of carbon in silicon carbide, particularly in the case of fibers, the fully converted silicon carbide material may include a narrow, hollow core surrounded by the silicon carbide. Such hollow cores may form during conversion of other forms of starting carbon material, as well.

By way of example, a hollow core in a fully converted silicon carbide material may have a diameter of from approximately 0.01 µm to approximately 0.1 µm for a silicon carbide nanoparticle, fiber, or other material having a diameter of 10 µm. The formation of the hollow core may be due to a lower diffusion rate for silicon inward than for carbon outward. Particularly in the case of fibers, nanorods, nanotubes, or other elongate structures, the hollow core may provide a dual wall to the fully converted silicon carbide material, which may provide a higher mechanical strength and higher bending radius. The hollow core may also reduce density, while increasing the overall mechanical strength of the fully converted silicon carbide material.

Fully or partially converted silicon carbide materials may be formed by slowly pulling, drawing, or otherwise conveying the carbon material through the reaction zone of the reaction chamber, which contains the silicon-containing gas and the carrier gas. Where the starting carbon material is in the form of nanoparticles or other non-fiber or even short, discontinuous fiber forms, the carbon material may be loaded into "boats" which are pulled, drawn, or otherwise conveyed through the reaction zone (e.g., into one end of the tube furnace, and eventually out the other) By enabling the carbon material and the silicon-containing gas to be in contact for a longer period of time, i.e., by increasing the reaction time, the carbon material may be fully converted into the desired polymorph of silicon carbide.

If the conditions within the reaction zone are maintained such that the reaction does not proceed to substantial completion, partially dense or partially converted silicon carbide materials may be formed. For instance, by drawing or otherwise conveying the carbon material through the reaction zone more quickly, such that the reaction of the carbon material and the silicon-containing gas does not proceed to completion, a partially converted silicon carbide material may be produced. In the partially converted form, an alpha or beta polymorph of silicon carbide conversion layer may be formed over a core of remaining unconverted starting carbon material. The carbon material underlying the alpha, beta, or other polymorph of silicon carbide conversion layer may be substantially unreacted with silicon and remain in its initial carbon form. The structure is not one in which silicon carbide becomes deposited through any type of deposition process, but is truly a chemical conversion, in which C—C atomic pairs are replaced with Si—C atomic pairs as the carbon material reacts with the silicon-containing gas. When forming other metallic carbides, the general principle of direct conversion remains the same (i.e., C—C atomic pairs are replaced with Metal-C atomic pairs, at the appropriate stoichiometry for the given metal carbide).

The partially converted silicon carbide material may provide enhanced environmental oxygen protection to the silicon carbide materials when used at high temperatures because, in the presence of oxygen, the silicon carbide conversion layer may react to form a protective layer of silicate glass, such as silicon dioxide. A thickness of the silicon carbide conversion layer on the core of the starting carbon material may depend on the reaction time and the reaction temperature. By way of example, the thickness of the silicon carbide conversion layer on a 10 µm diameter particle or fiber may be from approximately 0.001 µm to approximately 1 µm (e.g., up to about 10% of the starting material thickness). Given a constant reactant atmosphere, the thickness of the silicon carbide conversion layer may also depend on the movement rate of the carbon material through the reaction zone.

The reaction chamber in which the silicon carbide materials are produced may be a conventional high temperature tube furnace. The reaction chamber may be a continuous horizontal furnace or a continuous vertical furnace. Such furnaces are known in the art and, therefore, are not described in detail herein. By way of example, the reaction chamber may be a high temperature tube furnace that has been modified for continuous throughput processing of the starting carbon material. The silicon carbide materials may be produced in the hot tube section of the furnace, which functions as the reaction zone in which the reaction temperature and partial pressure of oxygen are controlled. By way of example, the tube may be formed from aluminum oxide, silicon carbide, or zirconium oxide. The tube entrance and exit ports may be water-cooled to maintain the desired entrance and exit room temperature during the reaction. The tube may also have end cap enclosures at both ends to enable the carrier gas to be injected into the tube and vented from the reaction chamber, and to provide an entrance port and exit port for the carbon material (e.g., which may enter the tube furnace on "boats" loaded with the carbon material being converted, which "boats" exit the tube furnace, loaded with the converted silicon carbide material. A conveyor belt, or any of various other conveyance structures may be used to move the starting carbon material and resulting converted metallic carbide material through the furnace.

The atmosphere within the tube may be maintained at a slight positive pressure of from approximately 1 psig to approximately 10 psig above atmospheric pressure to prevent an external atmosphere, such as air, from entering into the tube. As shown in FIG. 1, a silicon-containing gas 2, a carbon material 4, and a carrier gas 6 may be introduced into a reaction zone 8 of a furnace 10. As illustrated in FIG. 1, the silicon-containing gas 2 is generated in situ in the furnace 10, such as by placing silicon dioxide and silicon in the reaction zone 8 of the furnace 10 and heating the silicon dioxide and silicon as previously described. However, the silicon-containing gas 2 may also be flowed into the reaction zone 8 of the furnace 10 from an external source (not shown) of the silicon-containing gas 2. The carrier gas 6 may also be flowed into the reaction zone 8 of the furnace 10.

The carbon material 4 may be drawn, pulled or otherwise conveyed through the reaction zone 8 of the furnace 10 at a sufficient rate to enable the carbon material 4 and the silicon-containing gas 2 to react and produce the silicon carbide material 12, such as fully converted silicon carbide material or partially converted silicon carbide material. To provide sufficient time for the reaction to occur, the length of the reaction zone 8 may range from approximately five inches to approximately twenty inches. As the process is kinetically driven, a longer reaction zone may enable the carbon material to be conveyed through the reaction zone at a faster rate.

For fibrous materials, to enable filaments of a carbon material having filaments to be separated before entering the furnace 10, so as to increase their direct surface area exposure to the silicon monoxide, a tow spreader 14 may be positioned before the reaction zone 8 of the furnace 10. To maintain separation of filaments during drawing of a carbon fiber through the reaction zone 8, sufficient tensile pull force may be maintained on the carbon fiber material.

The method of producing the silicon carbide materials according to embodiments of the present disclosure is advantageous because the silicon carbide materials may be produced on a large scale and at a low cost, with minimal capital investment compared to the alternative production processes. Additionally, by starting with a carbon material in the same geometric, physical shape of the desired silicon carbide material, the silicon carbide materials may be formed without costly post-processing acts, enabling direct conversion of the starting carbon material of a given shape and size into the silicon carbide material sharing the shape and size of the starting carbon material.

It is estimated that silicon carbide fiber materials produced by the method of the present disclosure may have a total processing cost of from approximately $80 per pound to $200 per pound. In contrast, NICALON™ silicon carbide fibers, which are low temperature performance, beta silicon carbide fibers and include high impurities, cost from approximately $600 per pound to approximately $800 per pound. High purity, beta silicon carbide fibers sold under the HI-NICALON™ Type S trade name require additional processing and cost from approximately $4,000 per pound to approximately $6,000 per pound. In addition, the purity of the silicon carbide fibers produced by the method of the present disclosure may be higher than the purity of conventional beta silicon carbide fibers or other geometric size and shape forms. The method of the present disclosure is also advantageous because the silicon carbide materials may be produced by processes recognized to be "continuous" by those of skill in the art. Similar economic advantages may be provided with any of the other various contemplated forms of starting carbon materials (e.g., powders, platelets, foams, nanofibers, nanorods, nanotubes, whiskers, graphene sheets, fullerenes, hydrocarbons, etc.) and their associated similar shape and size forms, after conversion to silicon carbide.

The silicon carbide materials may be utilized in a variety of articles or end products where high heat transfer, high use temperature, or stability to nuclear radiation is desired. By way of example, both alpha and beta silicon carbide materials may have utility in the nuclear, aerospace, armor, or heat management industries, such as a reinforcement in a ceramic matrix composite (CMC), use as a matrix material in such CMC, or the like. The silicon carbide materials may be used in articles including, but not limited to, heat exchangers, filters, nuclear fuel containment, fusion reactor components, hot gas engines, turbine engines, hypersonic missile leading edges, or rocket components, such as rocket nozzles.

By way of example, the silicon carbide materials may be used in a cladding material, such as that described in U.S. Pat. No. 9,275,762, to Gamier et al., entitled "CLADDING MATERIAL, TUBE INCLUDING SUCH CLADDING MATERIAL AND METHODS OF FORMING THE SAME." The silicon carbide materials of the present disclosure may also be used as reinforcement in other materials, such as in metals, ceramics, metal-ceramics, glass, glass ceramics, graphite, carbon, or polymers, or as matrix materials for such composite materials. In addition, other materials utilized to provide internal structural support are foreseeable uses of the silicon carbide materials of the present disclosure.

Fully converted alpha silicon carbide fibers, nanoparticles or other forms of alpha SiC may exhibit higher mechanical strength retention to higher temperatures than conventionally formed beta polymorphs of silicon carbide. The alpha silicon carbide material may exhibit increased thermal conductivity (approximately 4.9 W/(cm-K)), and high temperature mechanical properties, such as to a temperature of greater than or equal to approximately 2100° C. These properties are beyond the capability of conventionally formed beta silicon carbide fibers, which are limited to use at temperatures of 1400° C. or less and have a thermal conductivity of approximately 3.6 W/(cm-K). Of course, the present direct conversion process can be used to produce beta silicon carbide fibers, nanoparticles, and other desired sizes and shapes, as well.

Figure 2:
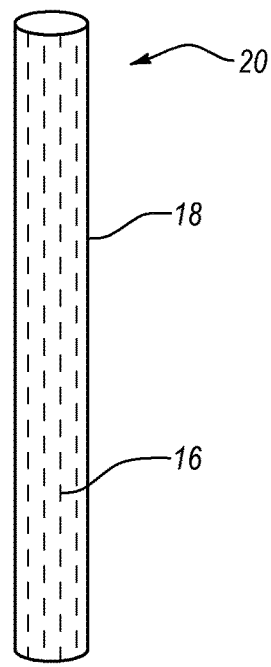
FIG. 2 is a schematic illustration of an article including a metal carbide material, such as alpha silicon carbide, beta silicon carbide, or other produced metal carbide material in a matrix according to embodiments of the disclosure.

As shown in FIG. 2, silicon carbide materials may be utilized as a matrix 18 or fiber or other reinforcement 16 to form a composite article 20, such as a CMC, having desirable properties. For use in high temperature applications, articles 20 including silicon carbide may advantageously avoid the temperature-activation, energy-driven phenomenon of Ostwald ripening, which may occur if a CMC contains dissimilar crystalline structures of silicon carbide. For these applications, the matrix 18 used with the reinforcement component 16 may be of the same polymorph (e.g., all beta or all alpha). The reinforcement component 16 may be dispersed or embedded within the matrix 18. The reinforcement component 16 may be incorporated into the matrix 18 by conventional techniques, which are, therefore, not described in detail herein, and shaped to produce the desired article 20. Elongate structures, such as fibers, including nanofibers, nanorods, nanotubes, or other elongate forms may be used as reinforcement component 16. Nanoparticles, such as powders, platelets, whiskers, foam, converted "2D" graphene sheets (converted to SiC 2D sheets), converted fullerenes (e.g., converted buckyballs), as well as various of the other contemplated forms may be used as matrix materials.

In some embodiments, one or the other of the reinforcing component 16 or the matrix 18 may be formed using conventional (e.g., CVD) techniques. A silicon carbide matrix 18 may also be formed from a pre-ceramic polymer, such as KiON CERASET® polysilazane 20 or CERASET® polyureasilazane, which are commercially available from the Clariant Corporation (Charlotte, N.C.) and are versatile, low viscosity liquid thermosetting resins. A silicon carbide matrix 18 may also be formed from SMP-10 polycarbosilane/siloxane, which is commercially available from Starfire Systems, Inc. (Malta, N.Y.). A pre-ceramic polymer may be converted to beta silicon carbide or, using a higher processing temperature and alpha silicon carbide crystal seeding, may be used to produce an alpha silicon carbide crystalline form. A pre-ceramic polymer may be processed at temperature conditions sufficient to effect formation of amorphous or crystalline silicon carbide of a desired polymorph. To achieve near full density of the silicon carbide matrix, from five to seven polymer infiltration process (PIP) cycles that each include polymer infiltration and conversion may be conducted.

The silicon carbide matrix 18 may also be formed using a polymeric carbon resin having sub-micron silicon particles. The polymeric carbon resin may have a particle size of less than or equal to approximately 10 μm. The polymeric carbon resins may be carbon rich, such as having a carbon to silicon ratio (C:Si) of from approximately 51:49 to approximately 60:40, such as approximately 55:45. The carbon rich stoichiometric ratio is desirable since the silicon particles have a thin outer oxide ($SiO_2$) layer, which is removed as carbon monoxide using the excess carbon in the resin.

A combination of polymeric carbon resins may be co-reacted at a temperature of from approximately 1750° C. to approximately 2100° C. to form an alpha silicon carbide matrix 18. Lower temperature may result in a beta silicon carbide matrix 18, or seeding with particles of the desired polymorph may be used. The polymeric carbon resin may include less than approximately 0.2% by weight of iron to avoid formation of lateral whiskers in the matrix 18. The resulting matrix 18 may be produced at a high yield and may achieve near full matrix density. Therefore, fewer PIP cycles may be needed, such as from 2 PIP cycles to 3 PIP cycles.

When the composite article 20 is used in low temperature applications, such as those conducted at a temperature of less than approximately 500° C., Ostwald ripening may proceed at a significantly slow rate. Thus, in such low temperature applications, there may be a mis-match between the polymorph of the matrix 18 and the reinforcing component 16 (e.g., one beta, and the other alpha polymorph, or both beta).

II. Exemplary Other Metal Carbides and Methods of Manufacture

Methods of forming at least one of calcium carbide or other metal carbide in various desired forms are disclosed, as are other metal carbide materials. In addition, articles including the metal carbide materials are disclosed. As used herein, the term "metal carbide" means and includes a chemical compound having at least one metal atom and at least one carbon atom, as indicated by the chemical formula $M_xC_y$, where x is 1 or 2, and y is 1, 2, or 3, or x and/or y are any of the values shown in Table 1 of Applicant's U.S. Patent No. of U.S. Pat. No. 9,803,296, which patent is incorporated by reference herein in its entirety. For convenience, the term "metal carbide" is used herein to collectively refer to calcium carbide, the rare earth carbides, and other carbides listed in Tables 1-2. The metal carbide may also be indicated herein by the terms "MC," "$MC_2$," "$M_2C_2$," "$M_2C_3$,", etc. where M is the metal (calcium or rare earth, or other metal) cation. By way of example, the metal carbide may include, but is not limited to: aluminum carbide ($Al_4C_3$), beryllium carbide ($Be_2C$), boron carbide ($B_4C$ to $B_{12}C$), calcium carbide (CaC and/or $CaC_6$), cerium carbide (CeC, $CeC_2$), chromium carbide ($Cr_3C_2$), dysprosium carbide ($DyC_2$), erbium carbide ($ErC_2$), europium carbide ($EuC_2$), gadolinium carbide ($GdC_2$ and/or $Gd_2C_2$), hafnium carbide ($HfC_2$), holmium carbide ($Ho_3C_2$), iron carbide ($Fe_2C$, $Fe_3C$, and/or $Fe_7C$), lanthanum carbide ($LaC_2$), lithium carbide ($Li_4C_3$), magnesium carbide ($Mg_2C$), manganese carbide (MnC), molybdenum carbide (MoC), niobium carbide (NbC and/or $NbC_2$), neodymium carbide ($Nd_4C_3$), praseodymium carbide ($PrC_2$), samarium carbide ($SmC_2$), scandium carbide ($ScC_2$) silicon carbide (SiC), tantalum carbide (TaC), terbium carbide ($TbC_2$), thulium carbide ($TmC_2$), thorium carbide (ThC), titanium carbide (TiC), tungsten carbide (WC), uranium carbide (UC and/or $UC_2$), vanadium carbide ($V_4C_3$), ytterbium carbide ($YbC_2$), yttrium carbide ($YC_2$) zirconium carbide (ZrC) carbide, and combinations thereof.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term may be used in preference to the perhaps more restrictive term "is" so as to avoid any implication that other, compatible materials, structures, features and methods usable in combination therewith should or must be, excluded. Of course, it will be appreciated that use of the term "is" does not necessarily implicate that other materials, structures, features, or methods are excluded.

The direct conversion process described above relative to formation of silicon carbide materials may also be used to form other metallic carbide materials. As used herein, the term "metal carbide" means and includes a chemical compound having at least one metal atom and at least one carbon atom, as indicated by the chemical formula $M_xC_y$, where x is 1 or 2, and y is 1, 2, or 3, or x and/or y are any of the values shown in Table 1 of Applicant's U.S. Pat. No. 9,803,296, already incorporated by reference herein. For convenience, the term "metal carbide" is used herein to collectively refer to calcium carbide, the rare earth carbides, and other carbides listed in Tables 1 of U.S. Pat. No. 9,803,296, as well as Table 1 of the present disclosure, provided below. The metal carbide may also be indicated herein by the terms "MC," "$MC_2$," "$M_2C_2$," "$M_2C_3$,", etc. where M is the metal (calcium or rare earth, or other metal) cation. By way of example, the metal carbide may include, but is not limited to: aluminum carbide ($Al_4C_3$), beryllium carbide ($Be_2C$), boron carbide ($B_4C$ to $B_{12}C$), calcium carbide (CaC and/or $CaC_6$), cerium carbide (CeC, $CeC_2$), chromium carbide ($Cr_3C_2$), dysprosium carbide ($DyC_2$), erbium carbide ($ErC_2$), europium carbide ($EuC_2$), gadolinium carbide ($GdC_2$ and/or $Gd_2C_2$), hafnium carbide ($HfC_2$), holmium carbide ($Ho_3C_2$), iron carbide ($Fe_2C$, $Fe_3C$, and/or $Fe_7C$), lanthanum carbide ($LaC_2$), lithium carbide ($Li_4C_3$), magnesium carbide ($Mg_2C$), manganese carbide (MnC), molybdenum carbide (MoC), niobium carbide (NbC and/or $NbC_2$), neodymium carbide ($Nd_4C_3$), praseodymium carbide ($PrC_2$), samarium carbide ($SmC_2$), scandium carbide ($ScC_2$) silicon carbide (SiC), tantalum carbide (TaC), terbium carbide ($TbC_2$), thulium carbide ($TmC_2$), thorium carbide (ThC), titanium carbide (TiC), tungsten carbide (WC), uranium carbide (UC and/or $UC_2$), vanadium carbide ($V_4C_3$), ytterbium carbide ($YbC_2$), yttrium carbide ($YC_2$) zirconium carbide (ZrC) carbide, and combinations thereof. Of course, the production of silicon carbide is already discussed in detail above. Production of boron carbide materials are described in detail in Applicant's U.S. Pat. No. 9,199,277, incorporated by reference in its entirety. While the disclosure of that patent may be focused on production of fiber forms, it will be appreciated in light of the present disclosure that such methods may be adapted for production of other forms (e.g., nanoparticles, powder, platelets, foams, nanofibers, nanorods, nanotubes, whiskers, "2D" sheets converted from graphene, converted fullerenes, etc.) of starting carbon material into corresponding forms of boron carbide, or corresponding forms of any of the other listed metal carbides.

In an embodiment, to form the metal carbide material, a gaseous metal species and a starting carbon material are reacted according to Reactions 5 and 6 with the preferred reaction being number 6.

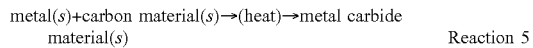

Reaction 5

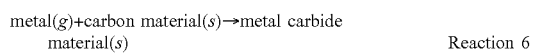

Reaction 6

The metal carbide material may be directly formed from the starting carbon material by vaporizing a metal source material (metal (s) in Reaction 5) to form the gaseous metal species (metal (g) in Reaction 6), and reacting the gaseous metal species with the carbon material. As used herein, the term "directly formed" means and includes formation of the metal carbide materials from a carbon feedstock material without requiring additional post-processing acts. The shape and size of the starting carbon feedstock material is generally maintained through the direct conversion process, with the material simply being converted to the desired metal carbide, instead of being the starting carbon material. Vaporization of the metal source material (Reaction 6) produces an environment containing metal atoms in gaseous form. As the metal source material is heated to a temperature greater than its vaporization point (when possible) or at least to its melting point, the gaseous metal species are formed and react with the starting carbon material, whether in fiber form, or present as a nanoparticle, or other form, such as powder, platelet, foam, nanofiber, nanorod, nanotube, whisker graphene sheet, fullerene, or hydrocarbon form.

Unfortunately, not all of these metals reach their boiling or vaporization point (boiling and vaporization point or temperature may be used interchangeably herein) for realistic operational temperature range below 3000° C. (exceptions are Ca with boiling point 1484° C., Eu (1597° C.), Sm (1791° C.), Yb (1194° C.), and Tm (1947° C.)). For metals that reach the boiling point, the metal vapor pressure is much higher than for metals that do not reach it. For the latter it may be advisable to operate below the vaporization point (but above the melting point) and take into account the fact that metal vapor pressure is lower for them, i.e., the process of carbon material conversion takes much longer relative to if the temperature were raised to above the vaporization point. That said, reaction kinetics are also dependent on temperature, so that in the formation of metal carbide materials for metals or metal oxides having relatively higher vaporization temperatures, the reaction time increase resulting from lower vapor pressure of the source material (e.g., metal or metal oxide) may be at least partially offset by the relatively higher temperature. In a typical example, reaction time will range from seconds to minutes (e.g., 1 second to 60 minutes, 2 seconds to 40 minutes, 5 seconds to 30 minutes, or 10 seconds to 10 minutes) to achieve partial, or even full conversion. The process is much faster than many other processes, even as compared to conventional processes for forming SiC materials. In addition, the process can be conducted as a continuous, rather than batch process (e.g., by drawing or otherwise conveying or feeding the carbon starting material into the reaction zone). It will be appreciated that although a "continuous" process may be preferred, batch processes are also possible.

Exceptions on use of metal vapor are noted in Table 1 below. An alternative method to form metal carbide materials can use the gaseous metal oxide species and a starting carbon material that are reacted according to Reactions 7 and 8 with the preferred reaction being number 8.

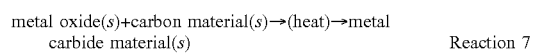

Reaction 7

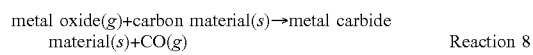

Reaction 8

The metal carbide materials may be directly formed from the carbon material by vaporizing a metal oxide source material (metal oxide (s) in Reaction 7) to form the gaseous metal oxide species (metal oxide (g) in Reaction 8), and reacting the gaseous metal oxide species with the carbon material. As used herein, the term "directly formed" means and includes formation of the metal carbide material from a starting carbon feedstock material without additional post-processing acts, and where the size and shape of the starting carbon feedstock material is generally maintained as the starting material is converted to its corresponding metal carbide material. In addition, no particular pre-processing (e.g., surface preparation of the carbon material) steps are required either. The carbon feedstock material may simply be as provided from the manufacturer in whatever form is typical. Any sizing may be "burned off" prior to reaching the reaction chamber or reaction temperature, where such may be present. Vaporization of the metal oxide source material (Reaction 8) produces an environment containing metal oxide in gaseous form. As the metal oxide source material is heated to a temperature greater than its vaporization point (when possible) or at least its melting point, the gaseous metal oxide species are formed and react with the carbon material.

When reaction between metal vapor and carbon occurs, no secondary gases (byproducts) are produced in reaction number 6. The reaction is a gas-solid phase reaction that results in the formation of the metal carbide material by an irreversible surface chemical exchange reaction between the carbon material and gaseous metal species. Reactions 5 and 6 are thermodynamically and kinetically driven and their rate is a function of the reaction temperature, reaction time, and relative mole fractions of the gaseous metal species and starting carbon material (e.g., conditions within the reaction zone). The carbon material may be partially converted or fully converted to metal carbide, with conversion of the carbon to metal carbide while preserving the original shape, size, and form of the starting carbon material, e.g., so that a carbon fiber becomes a metal carbide fiber, a carbon nanoparticle becomes a metal carbide nanoparticle, a carbon powder becomes a metal carbide powder, a carbon platelet becomes a metal carbide platelet, a carbon porous foam becomes a metal carbide porous foam, a carbon nanofiber becomes a metal carbide nanofiber, a carbon fullerene having any of various buckyball shapes becomes a metal carbide buckyball of similar size and shape, etc.

Depending on the reaction temperature and reaction time, conversion may be partial or complete. When reaction between metal oxide vapor and carbon occurs, a secondary gas (byproduct) of carbon monoxide is produced in reaction number 8. The reaction is a gas-solid phase reaction that results in the formation of the metal carbide material by an irreversible surface chemical exchange reaction between the carbon material and the metal oxide species. Reactions 7 and 8 are thermodynamically and kinetically driven and their rate is a function of the reaction temperature, reaction time, and relative mole fractions of the gaseous metal species and carbon material (e.g., conditions within the reaction zone). The carbon material may be partially converted or fully converted to metal carbide material of a form that corresponds to the form of the starting carbon material, as described in detail below, depending on the reaction temperature and reaction time. In the same way as described above, filaments, particles, layers, or other structures of carbon in the starting carbon material are progressively converted to metal carbide, retaining the fiber, filament, layer, or other geometric structure of the starting carbon material. It is essentially an atom-by-atom replacement, where the stoichiometric portion (e.g., half) the carbon atoms are replaced by the new metal atom species, to form the metal carbide having the same geometric form as the starting carbon material. Conversion proceeds from the exterior inwardly, so that a partially converted particle or other structure includes the outer portion of the carbon particle or other material converted to metal carbide, with the interior core remaining as unreacted carbon material. In any case, it is not a deposition of metal carbide onto the carbon material, but actual conversion of the carbon material itself. There is no significant dimensional change resulting in conversion from the starting carbon material to the converted metal carbide material. The process is not a coating, where such a coating would add to the dimension of the nanoparticle or other starting carbon material. Such is not the case with the present direct conversion methods.

The gaseous metal species may be produced from a metal or metal oxide source material, such as an elemental form of the metal, or an oxide compound of the metal. The metal source material may be a high purity solid, such as plate, lump, powder, nanoparticles, or other solid form of the metal. By way of example, the metal source material may be greater than approximately 90% pure, such as greater than approximately 95% pure or greater than approximately 99% pure. The solid metal source may be a high purity powder commercially available from a chemical supply company, such as from Sigma-Aldrich Co. (St. Louis, Mo.). Combinations of different solid metal (or metal oxide) source materials may be used. In such cases, the purity of the source material may be as above, relative to the mixture (e.g., little or no materials other than the desired metals or metal oxides are present).

The resulting metal carbide materials are typically in the same general form as the starting carbon material, but for at least some of the carbon having been converted to metal carbide. In some embodiments, the metal carbide material may be in the form of a fiber, such as a continuous fiber. Other forms, such as powders, platelets, foams, nanofibers, nanorods, nanotubes, whiskers, graphene sheets, fullerenes, hydrocarbons, or the like may also be used. The metal carbide material may have a diameter or other size parameter of from approximately 1 nm to 10,000 nm, such as 10 nm to 1000 nm (e.g., for a carbon nanofilament). Whatever the form of the carbon feedstock material, such material may be fed into the reaction zone and converted to metal carbide material (e.g., either fully or partially converted) of substantially the same physical form (e.g., substantially unchanged shape and size).

In some embodiments, the carbon material may be a carbonaceous material and may contain carbon in the form of graphite plates (e.g., graphene). The carbon material may include microscopic crystals that may or may not be axially aligned in long chains, such as in a polyaromatic hydrocarbon (e.g., pitch resin) or a polyacrylonitrile (PAN) processed carbon. Exemplary pitch resin materials may be mesophase pitch, isotropic pitch, rayon-based materials, or gas-phase grown materials. The carbon material may include an allotrope of carbon, such as graphite, lonsdaleite, or amorphous carbon. The carbon material may include carbon nanotubes, nanorods, or fullerenes (e.g., $C_{60}$, $C_{70}$, $C_{540}$) into which structures the gaseous metal species diffuse during the conversion reaction.

Carbon fiber materials of sufficient length may be fed or drawn through a reaction chamber (e.g., furnace) in which the reaction is conducted (e.g., as a continuous process), e.g., from spool to spool. For chopped, milled, or other discontinuous fibers, as well as powders, platelets, foams, nanofibers, nanotubes, nanorods, nanofilaments, whiskers, graphene, fullerenes, hydrocarbons, and the like, the process may similarly involve feeding the carbon starting material in whatever form (e.g., loaded into "boats") through the reaction zone of the reaction chamber on a conveyor or similar conveyance mechanism. The starting carbon material may be substantially pure in that the material predominantly includes carbon and hydrogen. By way of example, the starting carbon material may have a purity of greater than approximately 99.5%. To prevent the formation of catalytically grown whiskers during conversion, minimal impurities (on the order of less than parts per million (ppm) (e.g., less than 1000 ppm, less than 500 ppm, less than 100 ppm, less than 50 ppm, less than 25 ppm, less than 10 ppm, less than 5 ppm, less than 1 ppm), such as iron, may be present in the starting carbon material. Large quantities of suitable carbon materials are often commercially available.

In addition to the gaseous metal and/or metal oxide species that is present during the reaction, an inert carrier gas may also be used. The carrier gas may provide for movement of the gaseous metal and/or metal oxide species in the reaction chamber. The carrier gas may also be used to maintain a low partial pressure of oxygen ($PO_2$) in the reaction chamber. The carrier gas may be a high purity, inert gas such as argon having a low residual oxygen content ($PO_2$), a low nitrogen content ($PN_2$), and a low water content ($PH_2O$), with each species at a relative partial pressure of less than approximately $1.01 \times 10^2$ Pascal (0.001 atm). Each of the oxygen, nitrogen, or water in the carrier gas may be present at a concentration of less than approximately 1000 parts per million (ppm). The reaction kinetics associated with the present direct conversion process favors a slower diffusion of metal atoms into the carbon material and a faster diffusion of the carbon out of the carbon material, which may result in a "hollow" structure upon full conversion. Removal of carbon may occur at the surface of the starting carbon material if residual oxygen is present in the reaction chamber. Thus, residual oxygen in the reaction chamber should be kept to a minimal (part per million) amount to avoid excessive carbon removal.

For example, oxygen concentration in the carrier gas in the reaction chamber may be less than 1000 ppm, less than 500 ppm, less than 100 ppm, less than 50 ppm, less than 25 ppm, or less than 10 ppm). The same values may similarly apply to any nitrogen or water in the carrier gas of the reaction chamber. Nitrogen and/or water in the carrier gas may be maintained at even lower levels (e.g., less than 5 ppm, less than 1 ppm). As described below, a very small fraction of oxygen may be provided in the reaction chamber, to facilitate removal of one carbon atom from the carbon feedstock material for each carbon atom of the carbon feedstock material that is converted to metal carbide. Thus, in at least some embodiments, some (but very low) oxygen concentration may be present. The carrier gas may include one or more noble inert gases (e.g., including, but not limited to, argon, helium, neon, xenon, or combinations thereof). By utilizing an inert carrier gas of high purity, the resulting metal carbide material may include relatively low concentrations of impurities, such as oxygen or nitrogen, which if present may lower both thermal and mechanical properties of the metal carbide material and may be a source of swelling during use of the metal carbide material.

The conversion of carbon material in Reaction 6 is influenced by the volumetric effect. Every time a metal atom reacts with carbon material of the starting carbon material, the starting carbon material gets an additional atom that needs to be accommodated. There is no mechanism for some carbon atoms to leave the starting carbon material and to be substituted by metal atoms, unless an additional amount of controlled oxygen is provided in the reaction zone. In Reaction 8, for each MC molecule producing reaction, one carbon atom is released from the carbon feedstock material in the form of carbon monoxide (CO), which release provides the necessary volume expansion space so as to accommodate the metal atom. This is explained in more detail below.

One method is to use mainly turbostratic (e.g., where basal planes of the carbon material have slipped out of alignment) carbon materials. According to one theory, it is clear that metal atoms cannot directly go into dense carbon structure (e.g., a graphene sheet) because of the large (up to 60%) increase in metal-carbon bond length versus carbon-carbon bond length in the carbon structure. Also, such is energetically unfavorable because the binding energy of carbon in dense carbon structure is quite high. Therefore, metal atoms can be attached only to the edges or defects (e.g., voids) of carbon structure (e.g., graphene ribbons). This means that starting carbon material with a significant number of defects would be more preferable for Reaction 6 than high quality graphite material where the number of carbon structural defects is minimal and all carbon atoms are of the sp2 orbital bonding type. The turbostratic carbon forms where many carbon ribbons with defects are stacked layer by layer and are arranged without any strict order would be preferable for metal diffusion inside the starting carbon material and for forming bonds between metal and carbon atoms. In addition to existing structural defects in starting carbon material, one could think about forming new defects by etching existent carbon material in an oxygen atmosphere under controlled time and temperature conditions before conducting it into the reaction zone for reaction with metal vapor. Of course, in other embodiments, no such oxidation of the carbon starting material is employed, e.g., as it may undesirably affect the strength properties of the resulting material.

A solution to the problem of volumetric expansion of the initial starting carbon material may be significantly facilitated in the reaction between metal vapor and carbon if instead of elemental metal vapor in Reaction 6, one would employ the metal oxide vapor in the process: MO (gas)+2C (solid)→MC (solid)+CO (gas), which provides an alternate mechanism for removing some carbon atoms from the starting carbon material and substituting them with metal atoms. However, corresponding melting points for some of the contemplated rare earth metal oxides and calcium oxide are much higher (e.g., lying between 2200° C. and 2500° C.) than melting points of the corresponding elemental metals. Operating at such high temperatures often requires additional restrictions for the materials used in making the reaction chamber and other device components which are able to operate in such high temperature conditions. At lower temperatures, the vapor pressure of metal oxides will be related to the sublimation of the material from a solid, and are often negligible.

The starting carbon material is conveyed or otherwise fed through the reaction zone of the reaction chamber, which has already been described in regard to FIG. 1. Reaction occurs as the starting carbon material is drawn, conveyed or otherwise fed through the reaction chamber containing the gaseous metal and/or metal oxide species. The carrier gas is flowed into the reaction chamber at a sufficient flow rate to achieve the desired gaseous environment within the reaction chamber. The flow rate of the carrier gas at standard temperature and pressure conditions may range from 0.001 $m^3$/min to 0.01 $m^3$/min, for example. Of course, larger flow rates may be applicable to larger reaction chambers. Depending on the length of the reaction zone, which may range from inches to feet (e.g., 5 inches to 50 feet, (e.g., 500 inches for large scale commercial production)), the feed rate or conveyance rate of the starting carbon material through the reaction chamber may be from approximately 0.1 inch/minute to approximately 500 inches/min., or more. By way of example, for a 6-inch long reaction zone, the draw rate may range from approximately 0.1 inch/minute to approximately 10 inches/minute to achieve partially or fully converted metal carbide materials. Relatively slower draw rates (e.g., 0.1 inch/min) may be sufficient to achieve full conversion. The reaction zone of the reaction chamber may be maintained at a temperature sufficient for the gaseous metal and/or metal oxide species to be formed from the metal and/or metal oxide source material and for the gaseous metal and/or metal oxide species and starting carbon material to react, such as at a temperature between approximately 600° C. and approximately 2400° C., or between approximately 700° C. and approximately 2100° C., e.g., depending on the specific metal used. A graphite furnace may be operational up to approximately 2400° C. Other specialized materials could potentially be used at higher temperatures, should the desired reaction dictate such (e.g., see Table 2). Depending on the reaction temperature, reaction time (time during which the carbon material remains in the reaction zone), gaseous environment, relative mole fractions of the gaseous metal and/or metal oxide species and starting carbon material, and the form of the initial carbon material, the carbon material may be partially converted or fully converted to metal carbide material.

During the reaction, carbon diffuses out of the starting carbon material while metal atoms and/or metal oxide molecules of the gaseous metal species diffuse into the carbon material and react with the carbon, forming the metal carbide material. The respective diffusions of the metal and/or metal oxide and carbon may continue until approximately 50% of the carbon diffuses outward from the interior of the carbon material, while the other approximately 50% of the carbon (at full conversion of the starting carbon material) reacts to form the metal carbide.

Due to a high surface area of the carbon material and a small geometric size associated with many of the contemplated starting carbon materials (e.g., often at nanometer or micron scale particle or other shape dimensions, such as 1 nm, 5 nm, 10 nm, 100 nm, 1 µm, or up to 10 µm, such as 3-10 µm), the reaction may proceed to completion in an amount of time ranging from approximately seconds to approximately minutes depending on the length of the heated reaction zone. Larger sized carbon starting materials may take relatively longer than smaller particle sizes, or other applicable dimensional characteristics, as dictated by the geometry, size, and shape of the starting material. For example, reaction time may range from 1 second to 60 minutes, 2 seconds to 40 minutes, 5 seconds to 30 minutes, or 10 seconds to 10 minutes) to achieve partial, or even full conversion. However, the reaction time may also vary depending on whether partially converted metal carbide materials or fully converted metal carbide materials are to be formed (e.g., complete or relatively more complete conversion taking longer than relatively less complete conversion).

Reaction with the metal atoms (or metal oxide molecules) from the gaseous metal or metal oxide species occurs, resulting in formation and growth of sub-micron (e.g., less than 1 µm) grains of the metal carbide within the initial geometric structure of the starting carbon material. The fine grain structure may provide the resulting metal carbide material with improved mechanical strength. During the conversion process by metal or metal oxide vapor, the carbon core in a partially converted material may also contribute to the mechanical strength of the resulting material, e.g., particularly in the case of fibers, rods or the like. For example, partially converted metal carbide fiber may retain about 80% of the strength of the starting fiber (e.g., at least about 15%, at least about 20%, at least about 25%, at least about 30%, at least about 40%, at least about 50%, at least about 70%, at least about 80% of the strength of the starting carbon fiber), depending on the degree of conversion. Other starting carbon material geometries (e.g., nanoparticles, etc.) may exhibit similar or different strength retention characteristics. The various proposed end use application of the metal carbide material may dictate the particular characteristics of the initial carbon feedstock to be converted.

The metal carbide materials may initially, and transiently, be in the MC form, but may undergo transition to the $MC_2$ form (during the processing in the reaction zone), which is typically more stable at a higher temperature (at T>1500° C.). Other stoichiometric forms may also be applicable, for particular metal carbides. The transition to the $MC_2$ form may occur depending on the reaction temperature used and the time at the reaction temperature. By selecting the reaction temperature to be sufficiently above the vaporization temperature of the metal and/or metal oxide source material, the $MC_2$ form of the metal carbide material may be formed. The reactions to form the metal carbide materials from each of the metals or metal oxides are set forth in Table 1 below, in addition to the chemical formulae of the resulting metal carbide forms, the crystal structures of the resulting metal carbides, and the temperature range at which the reaction may be conducted.

Some of the metal carbides dissociate or decompose at a temperature below that at which the corresponding metal oxide melts. In such cases, it may be preferable to employ the conversion reaction based on use of the metal, rather than the metal oxide. In some embodiments, the metal or metal oxide source material may be heated not quite to its melting temperature, e.g., within 100° C. of the melting temperature, as will be apparent from Table 1.

TABLE 1

Reactions to Form Various Metal Carbide Materials from Metal or Metal Oxide Vapor.

| # | Metal Name | Metal | M melt (° C.) | T. Range[1] | MO melt Temp (° C.) | T. Range[2] | Metal Carbides[3] |
|---|---|---|---|---|---|---|---|
| 1 | Aluminum | Al | 660 | 620 to 1200 | $Al_4C_3$ dissociates < T oxide melt | | $Al_4C_3$ |
| 2 | Beryllium | Be | 1287 | 1250 to 1800 | $Be_2C$ dissociates < T oxide melt | | $Be_2C$ |
| 3 | Boron | B | 2076 | 2000 to 2400 | 450 | 450 to 2100 | $B_4C$ to $B_{12}C$ |
| 4 | Calcium | Ca | 842 | 800 to 1600 | $CaC_2$ dissociates < T oxide melt | | $CaC_2$, $CaC_6$ |
| 5 | Cerium | Ce | 795 | 750 to 2000 | CeC dissociates < T oxide melt | | CeC, Ce $C_2$ |

TABLE 1-continued

Reactions to Form Various Metal Carbide Materials from Metal or Metal Oxide Vapor.

| # | Metal Name | Metal | M melt (° C.) | T. Range[1] | MO melt Temp (° C.) | T. Range[2] | Metal Carbides[3] |
|---|---|---|---|---|---|---|---|
| 6 | Chromium | Cr | 1907 | 1850 to 2000 | 300 | >300 to <1000 | $Cr_3C_2$, $Cr_7C_3$ |
| 7 | Dysprosium | Dy | 1407 | 1350 to 1700 | $DyC_2$ dissociates < T oxide melt | | $DyC_2$ |
| 8 | Erbium | Er | 1529 | 1450 to 2100 | $ErC_2$ dissociates < T oxide melt | | $ErC_2$ |
| 9 | Europium | Eu | 826 | 750 to 1000 | $EuC_2$ dissociates < T oxide melt | | $EuC_2$ |
| 10 | Gadolinium | Gd | 1312 | 1250 to 2100 | $GdC_2$ dissociates < T oxide melt | | $GdC_2$ |
| 11 | Hafnium | Hf | 2758 | 2650 to 3200 | 2758 | 2700 to 3000 | HfC |
| 12 | Holmium | Ho | 1461 | 1350 to 2000 | $HoC_2$ dissociates < T oxide melt | | $Ho_3C_2$ |
| 13 | Iron | Fe | 1538 | 1450 to 2100 | 1377 | 1300 to 1600 | $Fe_2C$,$Fe_3C$,$Fe_7C$ |
| 14 | Lanthanum | La | 920 | 850 to 1600 | $LaC_2$ dissociates < T oxide melt | | $LaC_2$ |
| 15 | Lithium | Li | 180 | 120 to 800 | $Li_4C_3$ dissociates < T oxide melt | | $Li_4C_3$ |
| 16 | Magnesium | Mg | 650 | 600 to 1200 | $Mg_2C_3$ dissociates < T oxide melt | | $Mg_2C_3$ |
| 17 | Manganese | Mn | 1246 | 1150 to 1800 | 1945 | 1945 to 2200 | MnC, $Mn_3C$ |
| 18 | Molybdenum | Mo | 2623 | 2550 to 2900 | 1100 | 1100 to 1500 | MoC |
| 19 | Niobium | Nb | 2477 | 2350 to 3000 | NbC dissociates < T oxide melt | | NbC, $NbC_2$ |
| 20 | Neodymium | Nd | 1021 | 950 to 1600 | 2230 | 2200 to 3200 | $Nd_4C_3$ |
| 21 | Praseodymium | Pr | 935 | 850 to 1500 | $PrC_2$ dissociates < T oxide melt | | $PrC_2$ |
| 22 | Samarium | Sm | 1072 | 1000 to 1800 | $SmC_2$ dissociates < T oxide melt | | $SmC_2$ |
| 23 | Scandium | Sc | 1541 | 1500 to 2100 | 2485 | 2400 to 2600 | $ScC_2$ |
| 24 | Silicon | Si | 1414 | 1350 to 1900 | 1400 | 1400 to 2100 | SiC |
| 25 | Tantalum | Ta | 3027 | 2900 to 3400 | 1872 | 1800 to 2300 | TaC |
| 26 | Terbium | Tb | 1356 | 1300 to 1800 | $TbC_2$ dissociates < T oxide melt | | $TbC_2$ |
| 27 | Thulium | Tm | 1545 | 1450 to 2000 | 2341 | 2300 to 2500 | $TmC_2$ |
| 28 | Thorium | Th | 1750 | 1650 to 2200 | ThC dissociates < T oxide melt | | ThC |
| 29 | Titanium | Ti | 1668 | 1600 to 2000 | 1830 | 1800 to 2100 | TiC |
| 30 | Tungsten | W | 3422 | 3300 to 3600 | 1700 | 1700 to 2100 | WC |
| 31 | Uranium | U | 1132 | 1050 to 1900 | carbide dissociates < T oxide | | UC, $UC_2$ |
| 32 | Vanadium | V | 1910 | 1850 to 2400 | 690 | 650 to 1100 | $V_4C_3$ |
| 33 | Ytterbium | Yb | 824 | 750 to 1600 | $YbC_2$ dissociates < T oxide melt | | $YbC_2$ |
| 34 | Yttrium | Y | 1526 | 1450 to 2100 | $YC_2$ dissociates < T oxide melt | | $YC_2$ |
| 35 | Zirconium | Zr | 1855 | 1855 to 2200 | 2715 | 2715 to 3000 | ZrC |

[1]Metal Process (Reaction 6) M + C → MC. An exemplary Temperature Range (° C.) is provided in this column.
[2]Metal Oxide Process (Reaction 8) MO + 2C → MC + CO. An exemplary Temperature Range (° C.) is provided in this column.
[3]Metal Carbides formed as the starting carbon material is converted are provided in this column.
* When the dissociation temperature for the metal carbide is lower than the temperature at which the oxide melts, the preferred conversion process favors the metal vapor reaction (Equation 2) over the oxide vapor reaction (Equation 4).

For example, if cerium (#5 in Table 1) and the starting carbon material react at approximately 800° C. or higher, CeC may initially be formed. However, by raising the reaction temperature to greater than approximately 1100° C., the more stable form of $CeC_2$ may be formed. While the temperature above which each of the described metal carbides converts from the MC form to the other forms may not be known, the temperature above which the $MC_2$, $M_2C_2$, $M_2C_3$, etc. forms are formed may be determined by conducting the reactions in Table 1 and varying the reaction temperature within the temperature range in Table 1, along with the amount of time at the reaction temperature and the draw or feed rate. The $MC_2$ form of the metal carbide materials may be more stable at a temperature greater than 2200° C. compared to the $M_2C_2$ and $M_2C_3$ forms. The $MC_2$ form may also have improved mechanical strength retention at high temperature compared to the $M_2C_2$ and $M_2C_3$ forms.

Depending on the extent to which the reaction proceeds, the starting carbon material may be fully converted or partially converted into metal carbide material. By adjusting the conditions within the reaction zone, such as the reaction temperature, the draw or feed rate, and/or the reaction time, the metal carbide material may be formed on a continuum from partially converted metal carbide nanoparticle, fiber, or other material form to fully converted metal carbide nanoparticle, fiber, or other material form. The degree of conversion may affect the various strength and modulus values of the metal carbide material. By controlling the degree of conversion of the starting carbon material to the metal carbide material, these properties of the metal carbide material may be controlled.

If the reaction conditions are such that the reaction proceeds to substantial completion, fully converted (e.g., fully dense) metal carbide materials are formed. The fully converted metal carbide material may be formed by slowly conveying, drawing, or otherwise feeding the carbon material through the reaction zone 8 of the reaction chamber 10, which contains the gaseous metal or metal oxide species and the carrier gas. By enabling the starting carbon material and the gaseous metal and/or metal oxide species to be in contact for a longer period of time, i.e., by increasing the reaction time or decreasing the feed rate, the starting carbon material may be fully converted into the metal carbide material. Since the diffusion rate of metal atoms (or metal oxide molecules) into the carbon material may be lower than the diffusion rate of carbon out of the carbon material, the fully converted, metal carbide material may include the metal carbide material surrounding a hollow core, which reduces the density of the metal carbide material while maintaining the mechanical strength. The hollow core of the metal carbide material may have a diameter or other particle size dimension that is about 0.1% to about 10% of the converted metal carbide material (i.e., any hollow void within the center may be less than about 10% of the size of the converted nanoparticle or other shaped metal carbide material).

If present, the hollow core may provide altered mechanical properties to the metal carbide material as compared to a similar structure that did not include such a hollow core, or that was only partially converted. In one embodiment, the fully converted, metal carbide materials may be substantially homogenous metal carbide materials, such as $CaC_2$, $CaC_6$, $CeC_2$, $EuC_2$, $YbC_2$, $LaC_2$, $PrC_2$, $NdC_2$, $SmC_2$, $GdC_2$, $TbC_2$, $DyC_2$, $Ho_3C_2$, $YC_2$, $ErC_2$, $ScC_2$ SiC, $B_4C$ to $B_{12}C$, or $TmC_2$. A single particle or other metal carbide structure may include a combination of different metal carbides (e.g., by using different metal and/or metal oxide source materials, or processing a starting carbon material using one metal or metal oxide, followed by processing using a different metal or metal oxide. For example, such sequential processing using different metals or metal oxides may result in a layered structure of one metal carbide (first in sequence) over another metal carbide (later is sequence).

If the conditions within the reaction zone are maintained such that the reaction does not proceed to substantial completion, the partially converted (e.g., partially densified—the metal carbide generally has a higher density than the starting carbon material), metal carbide material may be formed. The partially converted, metal carbide material may include a layer (e.g., film) of metal carbide on a core of an unreacted core of starting carbon material. The partially converted, metal carbide material may be formed by relatively quickly conveying, drawing, or otherwise feeding the starting carbon material through the reaction zone 8 of the reaction chamber 10, which contains the gaseous metal and/or metal oxide species and the carrier gas. The kinetics of the process (time at temperature) may be controlled by the feed rate of the carbon material 4 through the reaction zone 8. For instance, by drawing or otherwise feeding the carbon material 4 through the reaction zone more quickly, the reaction of the carbon material 4 and the gaseous metal and/or metal oxide species may not proceed to completion (i.e., conversion of all carbon remaining in the starting carbon material), forming a partially converted, metal carbide material.

The carbon material underlying the metal carbide converted exterior layer may be substantially unreacted with the metal atoms, remaining in its initial carbon form. Due to the metal carbide layer, the partially converted, metal carbide material may exhibit enhanced environmental oxygen protection when used at high temperatures because, in the presence of oxygen, the metal carbide layer reacts with oxygen to form an oxidative protective layer. The metal carbide layer may also provide enhanced electrical conduction or magnetic field carrying capabilities to the metal carbide material. The thickness of the metal carbide layer on the starting carbon material depends on the reaction time and the reaction temperature. Given a constant reactant atmosphere, the thickness of the metal carbide layer also depends on the feed rate of the starting carbon material through the reaction zone.

Applicant has noted that conversion of starting carbon nanoparticles may result in converted metal carbide nanoparticles that do not adhere to one another, as do conventionally produced nanoparticles. For example, such nanoparticles may tend to remain separate from one another, rather than "clumping" together with like formed particles. For example, many commercially available metal carbide nanoparticles may have a nominal size (e.g., 1 μm), but will clump together, creating larger aggregate particles. The present particles may resist such clumping, so as to remain largely separate from one another. For example, clumping associated with the present particles may be limited to no more than that which creates particles double that of the particle nominal size, no more than 50% that of the nominal size, no more than 25% that of the nominal size, or no more than 10% that of the nominal size. This allows such particles to more easily be poured or otherwise moved or handled, without having to break large clumps of smaller nominal size particles apart from one another. Perhaps most importantly, such particles which exhibit reduced self-adhesion characteristics may provide for more uniform distribution within a given matrix material, imparting higher performance characteristics to the finished composite article.

By way of example, a partially converted, metal carbide material may include boron carbide, $CaC_2$, $DyC_2$ or any of the other metal carbides of Table 1 over a core of unconverted carbon material. The reaction of the carbon atoms of the starting carbon material may occur such that the carbon material itself acts as a template for the formation, or really conversion, of the carbon to metal carbide. Thus, the carbon does not merely act as a substrate upon which the metal carbide is formed (or deposited), nor simply as a source of carbon from which the metal carbide may form, but as a template having its given geometric structure (e.g., fibrous, graphene layered, fullerene structure, etc.), so that the finished metal carbide product includes the same or similar geometric structure as the original starting carbon material. The thickness of the converted layer may be any value up to that of full conversion. In an example, the converted layer may be as thin as about 0.1 nm, 0.5 nm, 1 nm, 10 nm, 100 nm, 0.25 μm, 0.5 μm or 1 μm. Stated another way, the converted layer may be as thin as about 10%, 5%, 2.5%, or 1% of the diameter of other applicable "size" of the overall particle. Such an embodiment may provide a thin oxidation protective layer, with the unconverted carbon core providing strength or other desired characteristics to the resulting material. It will be appreciated that thicker conversion layers (e.g., up to 20%, up to 30%, up to 40%, up to 50%, up to 60%, up to 70%, up to 80%, up to 90%, up to 95%, as well as 100% conversion, are of course also possible. The particular selected degree of conversion may depend on the contemplated end use of the converted metal carbide nanoparticles or other metal carbide material.

The reaction chamber in which the metal carbide materials are formed may be a conventional high temperature tube furnace. The reaction chamber may be a continuous horizontal furnace or a continuous vertical furnace. Such furnaces are known in the art and, therefore, are not described in detail herein. By way of example, the reaction chamber may be a high temperature tube furnace that has been modified for continuous throughput processing of the starting carbon material. The metal carbide material may be formed in the hot section tube of the furnace, which functions as the reaction zone in which the reaction temperature is controlled. By way of example, the tube may be formed from aluminum oxide, silicon carbide, boron carbide, zirconium oxide, graphite, other various high temperature refractory materials, or combinations thereof. The tube entrance and exit ports may be water-cooled to maintain the entrance and exit at room temperature during the reaction. The tube may also have end cap enclosures at both ends to enable the carrier gas to be injected into the tube and vented from the reaction chamber, and to provide an entrance port and exit port for the starting carbon material entering and converted metal carbide material exiting. The atmosphere within the tube may be maintained at a slight positive pressure relative to atmospheric pressure, from approximately 0.1 psig to approximately 1 psig to prevent an external atmosphere, such as air, from entering into the tube. In an embodiment, the pressure within the tube and the reaction zone may be maintained at about 1 atmosphere.

As shown in FIG. 1, a gaseous metal and/or metal oxide species 2, the starting carbon material 4, and a carrier gas 6 may be introduced into a reaction zone 8 of the furnace 10. The gaseous metal and/or metal oxide species 2 may be generated in situ in the furnace 10, such as by placing the metal or metal oxide source material (not shown) in the reaction zone 8 of the furnace 10 and heating the metal and/or metal oxide source material as previously described. However, the gaseous metal and/or metal oxide species 2 may also be flowed into the reaction zone 8 of the furnace 10 from an external source (not shown) of the gaseous metal and/or metal oxide species 2. The carrier gas 6 may also be flowing into the reaction zone 8 of the furnace 10. The carbon material 4 is provided in any of various solid forms, and may be drawn, conveyed, or otherwise fed through the reaction zone 8 of the furnace 10 at a sufficient rate to enable the starting carbon material 4 and the gaseous metal and/or metal oxide species 2 to react and form the converted metal carbide material, such as the fully or partially converted metal carbide materials described herein. To provide sufficient time for the reaction to occur, the length of the reaction zone 8 may range from approximately five inches to approximately five hundred inches or more, the latter of which is a length of a reaction zone in an industrial scale production furnace known to be commercially available, but is not limited by the length of a reaction zone which could be built longer than 500 inches. As the process is kinetically driven, a longer reaction zone may enable the starting carbon material 4 to be drawn through the reaction zone 8 at a faster rate.

Figure 3:
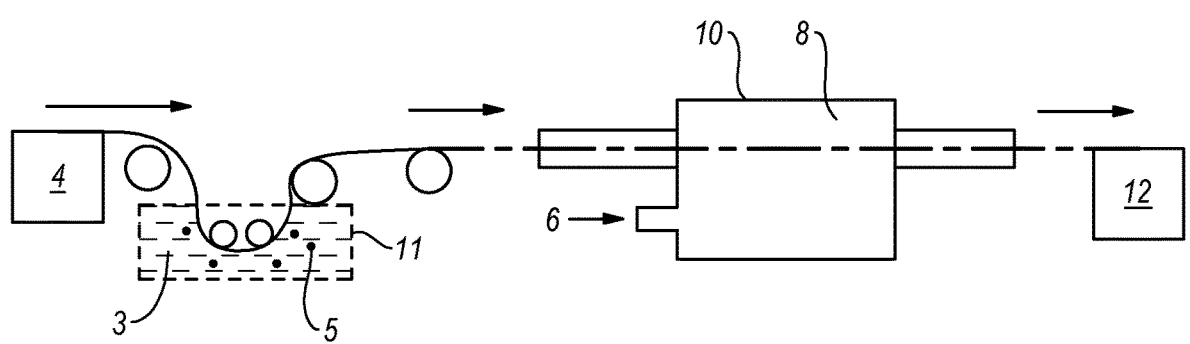
FIG. 3 is a schematic illustration of a reaction chamber utilized in a method to form metal carbide materials according to another embodiment of the disclosure.

The metal carbide materials may also be formed by a so-called "dip process" (Reaction 5 or 7) in which the starting carbon material 4 is coated with particles of the metal (silicon, boron, calcium or any of the rare earth metals), or metal oxide as shown in FIG. 3. The starting carbon material 4 may be immersed (e.g., dipped) in a composition 3 of the metal or metal oxide particles 5. The bath composition may include a solution, suspension, dispersion, slurry, or emulsion of the metal particles 5 in water or another solvent or carrier. The particles 5 may be a solid, such as metal or metal oxide nanoparticles. Typical particle size may range from about 0.001 μm to about 1 μm, from 0.01 μm to about 0.75 μm, or from about 0.1 μm to about 0.5 μm. The composition 3 may include from approximately 40% by weight to approximately 80% by weight of the metal particles 5 (e.g., from about 50% to about 60%, or about 70% by weight). When converting carbon nanoparticles, the size of the carbon nanoparticles being "dipped" may be similar to those mentioned above relative to the metal or metal oxide particles, or the metal or metal oxide particles may be smaller than any carbon nanoparticles. The viscosity of the composition may be sufficiently low to permit flow of the composition and penetration into the starting carbon material 4 but sufficiently high to adhere to the starting carbon material 4. Alternative to "dipping", such metal or metal oxide compositions could be sprayed or otherwise applied to the starting carbon nanoparticles or other starting carbon materials, prior to entry into furnace 10.

The starting carbon material 4 coated with the metal (or metal oxide) may then be heated in the reaction zone 8 to convert it into metal carbide material. The same conventional high temperature tube furnace shown in FIG. 1, e.g., at a temperature between 600° to 2400° C., 1000° C. and 2200° C., or any values in Tables 1-2, may be used for this purpose. The total amount of metal or metal oxide particles sticking to the starting carbon material in a "dip process" or a "spray" process may be selected based on understanding that distribution of metal carbide across the final converted metal carbide structure when dipping may be less homogeneous than in a process that is able to ensure more homogenous distribution in dipping or spraying; and that the carbon material may be only partially converted.

By way of example, to form fully converted, neodymium carbide nanoparticles or neodymium carbide material of other form, elemental neodymium may be placed in the reaction zone of the reaction chamber and the reaction zone heated to a temperature between 1021° C. and approximately 2100° C., producing some amount of neodymium atomic gas. The starting carbon nanoparticle material or starting carbon material in another form that corresponds to a desired converted form for the neodymium carbide material may be drawn, fed, or otherwise conveyed through the reaction zone and the neodymium gas may initially react with an outer portion of the carbon material, producing a conversion layer of neodymium carbide on the carbon material, as the outer layer of the carbon material is converted to neodymium carbide. The neodymium may diffuse further into the carbon material, continuing the conversion of the carbon material to neodymium carbide. As the carbon material is being converted to neodymium carbide, any carbon remaining in the carbon material is substantially present in an inner core portion of the partially converted material. Once substantially no free carbon remains in the carbon material (e.g., substantially all of the carbon material has been converted to neodymium carbide), the reaction may be substantially complete and result in the formation of the fully converted, neodymium carbide nanoparticles or neodymium carbide in other form (e.g., powder, platelets, foam, nanofiber, nanorod, nanotube, whisker, 2D layer converted from graphene, converted fullerene "buckyball" structures, solid hydrocarbons, etc.). Examples based on each of metals 1-35 of Table 1 may be conducted in a similar manner, with a change in temperature to the values shown in Table 1. Further, examples based on each of metals 1-35 of Table 1 may be conducted in a similar manner, but in which an oxide of the metal is used as the source material, rather than the elemental metal.

The metal carbide materials may be used in a variety of high temperature (e.g., up to approximately 2100° C., or even higher, e.g., for at least some of the carbides of refractory metals), structural applications, such as in industrial, military, nuclear, electrical, and aerospace areas. The metal carbide nanoparticles or other shaped materials may provide increases in thermal efficiency resulting from increased temperature capability and performance enhancements resulting from higher temperature device performance. For instance, the metal carbide materials may be used in high field strength magnets (rare earth magnets ($GdC_2$, $DyC_2$, $SmC_2$, $NdC_2$)), permanent magnets, lasers, alloy reinforcements in steels, recording devices, electrical motors, nuclear structural applications including fuel cladding, channel and other supporting structure inside the reactor core regions, neutron capture masers ($SmC_2$), chemical reducing agents ($YbC_2$), vanadium steel (($ErC_2$), ceramic capacitors ($NdC_2$), battery-electrodes ($LaC_2$), fluid catalytic cracking ($LaC_2$), hydrogen storage ($LaC_2$), mercury vapor lamps ($EuC_2$), catalysts, flints for cigarette lighters, phosphors, motion picture projectors, X-ray intensifying screens, or emitters in projection televisions ($TbC_2$), to name just a few. The metal carbide materials may also be used in high temperature, ceramic matrix composite (CMC), metal matrix composite (MMC), polymer matrix composite, (PMC) or other composite application areas including nuclear, aerospace and novel thermoelectric generators.

By way of example, Eu, Sm, Gd, Dy, and Sc exhibit large neutron cross sections, so the resulting carbides ($EuC_2$, $SmC_2$, $GdC_2$, $DyC_2$, and $ScC_2$) are expected to exhibit large neutron cross sections, enabling their use in various nuclear applications. Er, Ho, Yb, Ce, and Ca exhibit low thermal neutron cross sections, so the resulting carbides ($ErC_2$, $Ho_3C_2$, $YbC_2$, $CeC_2$, and $CaC_2$) are expected to exhibit low thermal neutron cross sections, enabling their use in various nuclear applications.

The metal carbide materials, may have utility in the nuclear, aerospace, armor, heat management, marine, submarine, land transport (truck, bus, or automobile), and electronics industries, such as nanoparticle matrix materials and/or fiber reinforcement in a ceramic matrix composite (CMC), or metal matrix composite (MMC), or polymer matrix composite PMC. The metal carbide materials may be used in articles including, but not limited to, heat exchangers, gas separation membranes, catalyst supports, filters, nuclear fuel containment, fusion reactor components, hot gas engines, turbine engines, hypersonic missile leading edges, tail sections, heat shields, jet vanes, space structure stabilization, chemical liners, metal matrix liners, pipes, nanoporous structures, body frames, brake pads, body armor, vehicle armor, sporting goods, drill bits, wear bits, hypersonic missiles, or rocket components, such as rocket nozzles.

In nuclear applications, the metal carbide materials may be used in shielding, control rods, shut down pellets, fusion plasma facing components, such as radio frequency antennae, or injectors. The metal carbide materials may, thus, be used to produce devices such as metal-ceramic or ceramic tubes to contain nuclear fuel (e.g., fissile material) and enable longer fuel use times (e.g., higher fuel burn ups) while imparting significant additional thermal and high temperature mechanical properties to the containment tube in the event of an "off-normal" event, such as loss of reactor core coolant. Given the resurgence of nuclear energy worldwide, there is a major need today for both safety and economical performance enhancements to power plant or other reactor operations. The metal carbide materials may be incorporated in articles by conventional techniques, which are not described in detail herein, and may be selected based on the intended use of the metal carbide material (e.g., various methods of embedding fibers into a carbide matrix from which the article is formed, or using the carbide materials as fiber reinforcement in such a composite).

As illustrated in FIG. 2, any of the metal carbide materials could be utilized as a matrix 18 to form an article 20, such as a ceramic, polymer and/or metal matrix composite (CMC, PMC, or MMC), having desirable properties. Metal carbide materials that are configured as fibers, nanofibers, nanotubes, or nanorods could be used as fiber reinforcement in such composites. Such reinforcing fibers may be homogenously dispersed within the matrix. Orientation of the fibers may be random, or oriented in a particular direction, as desired.

In such a composite, reinforcing fibers 16 may be dispersed or embedded within the matrix 18. Either the fibers 16 or the matrix 18, or both may be formed from any of the metal carbide materials described herein. Combinations of the various metal carbide materials may be used for reinforcing fibers and or as matrix materials in such composites. For example, carbide matrix materials 18 formed as described herein that may be used may include, but are not limited to, boron carbide ($B_4C$ to $B_{12}C$, such as $B_5C$ to $B_{12}C$, including $B_{10.4}C$), silicon carbide (SiC) (alpha, beta or other polymorph), hafnium carbide (HfC), titanium carbide (TiC), etc. The matrix may be in a monolithic form of sintered nanoparticles, etc.

The metal carbide materials may be used as a fiber reinforcement or nanoparticle matrix material for ceramic or metal-ceramic articles used as nuclear control rod materials in a nuclear reactor including, but not limited to, a light water reactor (LWR), a pressurized water reactor (PWR), a liquid metal fast reactor (LMFR), a high temperature gas-cooled reactor (HTGR), or a steam-cooled boiling water reactor (SCBWR). The metal carbide materials may be used as fibers and/or nanoparticle matrix materials 18 to produce articles 20, such as metal-ceramic tubes or ceramic tubes, to contain other conventional nuclear control materials. By way of example, the metal carbide materials 16 and matrix 18 may be used to form tubes. The articles 20 may be particularly stable to irradiation. Control rods or other tubes may be formed from metal carbide fibers 16 and the metal carbide matrix nanoparticles 18.

All publications, patents and patent applications cited herein are hereby incorporated by reference in their entirety to the same extent as if each individual publication, patent or patent application was specifically and individually indicated to be incorporated by reference. For example, any of the conditions or starting materials described in the inventor's earlier applications, already referenced, may be adapted for use according to the methods, metal carbide fibers, or articles disclosed herein.

Numbers, percentages, or other values stated herein are intended to include that value, and also other values that are about or approximately the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Furthermore, the terms "substantially", "about" or "approximately" as used herein represents an amount close to the stated amount that still performs a desired function or achieves a desired result. For example, the term "substantially" "about" or "approximately" may refer to an amount that is within 10% of, within 5% of, within 1% of, within 0.1% of, and within 0.01% of a stated amount or value.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope While the disclosure may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the scope of the invention as defined by the following appended claims and their legal equivalents.

What is claimed is:

1. A method of producing silicon carbide material, comprising:

reacting a carbon material and a silicon-containing gas in a reaction chamber at an elevated temperature of up to approximately 2400° C. and a pressure of about 1 atmosphere; and maintaining a partial pressure of oxygen in the reaction chamber of less than approximately $1.01 \times 10^2$ Pascal to produce the silicon carbide material.

2. The method of claim 1, wherein reacting a carbon material and a silicon-containing gas in a reaction chamber comprises reacting the carbon material with silicon monoxide in the reaction chamber.

3. The method of claim 2, wherein reacting the carbon material and silicon monoxide in a reaction chamber comprises forming the silicon monoxide in situ in the reaction chamber.

4. The method of claim 3, wherein forming the silicon monoxide in situ in the reaction chamber comprises reacting silicon dioxide and silicon in the reaction chamber.

5. The method of claim 1, wherein reacting a carbon material and the silicon-containing gas in the reaction chamber comprises reacting a carbon nanoparticle and silicon monoxide in the reaction chamber.

6. The method of claim 5, wherein maintaining the partial pressure of oxygen in the reaction chamber of less than approximately $1.01 \times 10^2$ Pascal to produce silicon carbide nanoparticles comprises producing the silicon carbide nanoparticles:
 (i) that comprise a converted layer of silicon carbide on an unconverted carbon material, where the converted layer has been converted from carbon to silicon carbide; or
 (ii) that are fully converted from carbon to silicon carbide.

7. The method of claim 1, wherein reacting a carbon material and a silicon-containing gas in a reaction chamber at a temperature of up to approximately 2400° C. comprises reacting the carbon material and the silicon-containing gas at a temperature ranging from approximately 1500° C. to approximately 1800° C. to produce alpha silicon carbide.

8. The method of claim 1, wherein reacting a carbon material and a silicon-containing gas in a reaction chamber at a temperature of up to approximately 2400° C. comprises reacting the carbon material and the silicon-containing gas at a temperature ranging from approximately 1100° C. to approximately 1450° C. to produce beta silicon carbide.

9. The method of claim 1, wherein a pressure within the reaction zone is maintained at a positive pressure of from approximately 1 psig to approximately 10 psig above atmospheric pressure to prevent an external atmosphere from entering into the reaction chamber.

10. The method of claim 1, wherein a vapor pressure of silicon monoxide species in the reaction chamber is maintained at approximately 1 atm.

11. The method of claim 1, wherein the produced silicon carbide material comprises alpha silicon carbide nanoparticles.

12. The method of claim 1, wherein the carbon material comprises carbon nanoparticles in the form of powder, platelet, foam, nanofiber, nanofilament, nanorod, nanotube, graphene, or fullerene.

13. The method of claim 1, wherein the produced silicon carbide material is formed from nanocarbon particles having a size of approximately 1 nm or larger.

14. The method of claim 1, wherein the produced silicon carbide material comprises a silicon carbide material in the form of powder, platelet, foam, nanofiber, nanorod, or nanotube.

15. The method of claim 1, wherein the produced silicon carbide material comprises:
 (i) a fully converted silicon carbide material, where the starting carbon material is a starting carbon nanoparticle material and has been substantially fully converted to the silicon carbide material, wherein the silicon carbide material comprises carbon from the starting carbon nanoparticle material that has been converted to the silicon carbide; or
 (ii) a partially converted silicon carbide material, where the starting carbon material is a starting carbon nanoparticle material, the silicon carbide material comprising a silicon carbide material disposed over a carbon nanoparticle core, wherein the silicon carbide material comprises carbon from the starting carbon nanoparticle material that has been converted to the silicon carbide material, and wherein the carbon nanoparticle core comprises unconverted starting carbon nanoparticle material.

16. The method of claim 15, wherein the produced silicon carbide material comprises a fully converted silicon carbide material, where the starting carbon material is a starting carbon nanoparticle material and has been substantially fully converted to the silicon carbide material, wherein the silicon carbide material comprises carbon from the starting carbon nanoparticle material that has been converted to the silicon carbide.

17. The method of claim 15, wherein the produced silicon carbide material comprises a partially converted silicon carbide material, where the starting carbon material is a starting carbon nanoparticle material, the silicon carbide material comprising a silicon carbide material disposed over a carbon nanoparticle core, wherein the silicon carbide material comprises carbon from the starting carbon nanoparticle material that has been converted to the silicon carbide material, and wherein the carbon nanoparticle core comprises unconverted starting carbon nanoparticle material.

18. The method of claim 15, wherein a size of the produced silicon carbide material is 1 nm or greater.

19. The method of claim 1, wherein the method is a continuous process.

20. The method of claim 1, wherein less than 1000 ppm of any iron or other impurities are present during the method to prevent formation of catalytically grown whiskers during conversion.

* * * * *